US012496688B2

(12) United States Patent
Li

(10) Patent No.: US 12,496,688 B2
(45) Date of Patent: Dec. 16, 2025

(54) RATCHET MECHANISM AND HAND TOOL

(71) Applicant: HANGZHOU GREAT STAR INDUSTRIAL CO., LTD., Hangzhou (CN)

(72) Inventor: Yueming Li, Hangzhou (CN)

(73) Assignee: HANGZHOU GREAT STAR INDUSTRIAL CO., LTD., Hangzhou (CN)

( * ) Notice: Subject to any disclaimer, the term of this patent is extended or adjusted under 35 U.S.C. 154(b) by 394 days.

(21) Appl. No.: 18/085,709

(22) Filed: Dec. 21, 2022

(65) Prior Publication Data

US 2023/0311276 A1 Oct. 5, 2023

Related U.S. Application Data

(63) Continuation-in-part of application No. PCT/CN2022/083573, filed on Mar. 29, 2022.

(51) Int. Cl.
*B25B 13/46* (2006.01)
*B25B 15/04* (2006.01)

(52) U.S. Cl.
CPC ............ *B25B 13/465* (2013.01); *B25B 15/04* (2013.01)

(58) Field of Classification Search
CPC .... B25B 13/465; B25B 15/04; B25B 23/0028
USPC .......................................................... 81/60
See application file for complete search history.

(56) References Cited

U.S. PATENT DOCUMENTS

| | | | | |
|---|---|---|---|---|
| 75,089 | A * | 3/1868 | Weston | B25B 13/463 81/60 |
| 4,466,523 | A | 8/1984 | De Carolis et al. | |
| 5,537,899 | A * | 7/1996 | Diedrich | B25B 21/004 81/62 |
| 6,276,239 | B1 * | 8/2001 | Albertson | B25B 13/462 81/59.1 |
| 8,490,521 | B2 * | 7/2013 | Huang | B25B 13/465 81/63.1 |
| 8,931,375 | B2 * | 1/2015 | Huang | B25B 15/04 81/63.1 |
| 2012/0167723 | A1 * | 7/2012 | Gapp | B25B 13/48 81/62 |
| 2013/0341147 | A1 | 12/2013 | Buchanan | |

(Continued)

FOREIGN PATENT DOCUMENTS

| | | |
|---|---|---|
| CN | 103934776 A | 7/2014 |
| CN | 105658378 A | 6/2016 |
| CN | 206839963 U | 1/2018 |

(Continued)

*Primary Examiner* — Hadi Shakeri

(74) *Attorney, Agent, or Firm* — Andrus Intellectual Property Law, LLP

(57) ABSTRACT

A ratchet mechanism includes: a first member having an annular surface provided with a plurality of teeth arranged parallel to its axial direction; a second member configured to be rotatable relative to a circumferential direction of the annular surface; at least two first drive transmission members arranged on the second member, each including at least one ratchet tooth, the first drive transmission members being configured to be engaged with the teeth to transmit motion between the first member and the second member, where the ratchet tooth of each of the first drive transmission members is in different engaged states with the teeth.

11 Claims, 15 Drawing Sheets

(56) References Cited

U.S. PATENT DOCUMENTS

2015/0135908 A1 5/2015 Solar et al.

FOREIGN PATENT DOCUMENTS

| | | | |
|---|---|---|---|
| JP | 2010230023 | A | 10/2010 |
| TW | 200538242 | A | 12/2005 |
| TW | 201311401 | A | 3/2013 |

* cited by examiner

RATCHET MECHANISM AND HAND TOOL

CROSS REFERENCE TO RELATED APPLICATION

The present application is a continuation-in-part (CIP) application claiming benefit of International Application No. PCT/CN2022/083573 filed on Mar. 29, 2022, the disclosure of which is incorporated herein in its entirety by reference.

FIELD OF THE INVENTION

The present application relates to the technical field of hand tools, and in particular to a ratchet mechanism and a hand tool.

DESCRIPTION OF THE PRIOR ART

In general, when a hand tool such as a screwdriver or a torque wrench is in use, the movement of a hand in a direction of rotation is limited to a certain extent and it will not continue in one direction, so the hand has to move in an opposite direction of rotation, or the hand tool is released from the rotated screw and then is rotated again after position adjusting. In some small narrow spaces, limited by the operating space, it is also necessary to constantly adjust the position of the hand or the position of the tool.

With the emergence of ratchet wrenches and ratchet screwdrivers, during the movement of a hand in a direction of rotation, an operating handle of a tool can be rotated backward, which effectively overcomes the above problems. In the existing ratchet wrenches or ratchet screwdrivers, when a ratchet pawl transmits force, torque applied to a handle is transmitted to an output end through a ratchet pawl transmission mechanism. When the handle is restored in position, the ratchet pawl transmission mechanism idles, and every time it rotates past a tooth, the pawl slides on the ratchet to produce a “click” sound. Therefore, in the process of force applying and position restoring through the handle, there is always a tooth gap, i.e., when the handle is forced to reach a limit position, the handle can continue to be forced to rotate only when the handle is restored in position and rotated by not less than a central angle corresponding to one tooth. Taking 60 gear teeth evenly distributed on the circumference of the ratchet as an example, the central angle corresponding to one gear tooth is 6°, i.e., when the handle reaches the limit position, it can only continue to rotate after the handle is restored in position and rotated by 6°. Taking 72 gear teeth evenly distributed on the circumference of the ratchet as an example, the central angle corresponding to one gear tooth is 5°, i.e., when the handle reaches the limit position, it can only continue to rotate after the handle is restored in position and rotated by 5°. To reduce the angle of rotation for position restoring of the handle, the number of gear teeth may be increased. However, under the condition of guaranteeing the tooth size and product strength, increasing the number of gear teeth will inevitably lead to an increase of the overall size of the ratchet. If the number of gear teeth is increased on the premise of keeping the shape and size of the ratchet unchanged, it will lead to smaller-sized gear teeth, reduce the reliability of engagement between pawls and gear teeth, and reduce the force transmission capacity. In addition, when the number of gear teeth is small, the resistance of backward rotation is large, which easily leads to use failure of the ratchet and the shaking is large. Therefore, under the condition that the outer diameter size is limited, in order to guarantee the strength of the product, the number of gear teeth of the ratchet cannot be increased indefinitely, and this small number of teeth leads to a large angle of backward rotation, thus affecting its use in small narrow spaces.

Therefore, those skilled in the art are committed to providing a ratchet mechanism and a hand tool made thereby, which can guarantee the strength of the product, reduce the resistance of backward rotation, reduce the shaking, better eliminate the effect of the tooth clearance, and improve transmission efficiency under the condition that the outer diameter size is limited.

SUMMARY OF THE INVENTION

In view of the shortcomings of the prior art, the technical problem to be solved by the present application is to provide a ratchet mechanism and a hand tool therefor which can reduce the resistance when a ratchet rotates backward.

To achieve the above objective, the present application provides a ratchet mechanism, which includes:

- a first member having an annular surface provided with a plurality of teeth that are arranged parallel to its axial direction;
- a second member configured to be rotatable relative to a circumferential direction of the annular surface; and
- at least two first drive transmission members arranged on the second member, each of the first drive transmission members including at least one ratchet tooth, the first drive transmission members being configured to be engaged with the teeth to transmit motion between the first member and the second member, where the ratchet tooth of each of the first drive transmission members is in different engaged states with the teeth.

Further, the ratchet mechanism further includes at least two second drive transmission members arranged on the second member, each of the second drive transmission members including at least one ratchet tooth, the second drive transmission members being configured to be engaged with the teeth to transmit unidirectional motion between the first member and the second member, where the ratchet tooth of each of the second drive transmission members is in different engaged states with the teeth;

- when the first member and the second member move relative to each other in a first direction, the first drive transmission members are in working states, and the second drive transmission members are in non-working states; and when the first member and the second member move relative to each other in a second direction, the second drive transmission members are in working states, and the first drive transmission members are in non-working states.

Further, the engaged states include a state in which the drive transmission members are fully engaged with the teeth, and a state in which the drive transmission members are partially engaged with the teeth.

Further, the second member includes a plurality of receiving grooves for supporting the drive transmission members, at least one of the drive transmission members is arranged in each of the receiving groove, each of the receiving groove has an opening facing the teeth, and at least part of a drive transmission member passes through the opening such that the ratchet tooth of the drive transmission member is engaged with the teeth; and an elastic element is connected to the drive transmission member.

Further, a contact surface of each of the receiving grooves with the drive transmission member received therein has a different inclination angle relative to a radial direction of the annular surface, such that the drive transmission members have different advance angles, so as to be in different engaged states with the teeth.

Further, the teeth are located on an inner circumferential surface of the annular surface and the second member is located within a chamber defined by the annular surface.

Further, each of the receiving grooves has a first opening and a second opening arranged oppositely, one of the first drive transmission members is located at the first opening, and one of the second drive transmission members is located at the second opening; and a first elastic element is arranged between the one of the first drive transmission members and the one of the second transmission members.

Further, each of the drive transmission members has a first side surface and a second side surface arranged oppositely, the ratchet tooth is provided on the first side surface, the second side surface is located in one of the receiving grooves, there is an inclined surface between the first side surface and the second side surface, and the inclined surface is in contact with the contact surface of the one of the receiving grooves; and each of the receiving grooves is provided with one of the drive transmission members, and a first elastic element is provided between the one of the drive transmission members and a sidewall of the one of the receiving grooves.

Further, the ratchet mechanism further includes an annular support provided at an end of the second member, where an elongated through hole is provided in the annular support at a position corresponding to a drive transmission member, one end of the drive transmission member extends into the elongated through hole, and an inclination angle of the elongated through hole relative to the radial direction is the same as that of the corresponding contact surface.

Further, the ratchet mechanism further includes a switching component provided on the second member, where the switching component is configured to switch the working states of the first drive transmission members and the second drive transmission members.

Further, the switching component includes an end cover arranged at an end of the second member and configured to be rotatable to a first position and a second position relative to the second member; at least two blocking pieces are provided on a side of the end cover facing the second member; when the end cover is in the first position, each of the blocking pieces contacts a corresponding one of the first drive transmission members to make it in a non-working state; and when the end cover is in the second position, each of the blocking pieces contacts a corresponding one of the second transmission members to make it in a non-working state.

Further, a limiting portion protrudes from a side of the end cover facing the second member, the second member is provided with a limiting groove cooperating with the limiting portion, and the limiting portion is configured to be slidable in the limiting groove when the end cover is rotated; and the movement of the limiting portion is blocked by two ends of the limiting groove, so that the end cover is in either the first position or the second position.

Further, the limiting portion includes a first recess and a second recess arranged in series, the second member is provided with a locking groove communicating with the limiting groove, and a locking ball is provided in the locking groove; when the end cover is in the first position, the first recess faces the locking groove, so that the locking ball enters the first recess; and when the end cover is in the second position, the second recess faces the locking groove, so that the locking ball enters the second recess.

Further, a circular boss is provided on a side of the end cover facing the second member, and a circular recessed portion cooperating with the circular boss is provided on the second member; the circular boss is configured to be slidable in the circular recessed portion when the end cover is rotated; and a limiting portion protrudes radially from an edge of the circular boss, a sidewall of the circular recessed portion is provided with a limiting groove, the limiting portion is slidable in the limiting groove, and the movement of the limiting portion is blocked by two ends of the limiting groove, so that the end cover is in either the first position or the second position.

Further, a first groove and a second groove are provided in the sidewall of the circular recessed portion, a transverse groove is provided in the circular boss, and a locking ball is provided in the transverse groove; when the end cover is in the first position, the transverse groove communicates with the first groove, and the locking ball enters the first groove; and when the end cover is in the second position, the transverse groove communicates with the second groove, and the locking ball enters the second groove.

Further, the first member defines a chamber, and an inner surface of the chamber forms the annular surface;

the ratchet mechanism includes two sector-shaped parts arranged oppositely, and the sector-shaped parts are located in the chamber; one end of each of the sector-shaped parts forms a first drive transmission member, and the other end forms a second drive transmission member; and an elastic element is provided between the sector-shaped parts; and a through hole is provided in the middle of each of the sector-shaped parts, and a columnar portion corresponding to the through hole is provided on the second member.

Further, the ratchet mechanism further includes a support member, where the support member includes an annular portion and a shaft portion, and the shaft portion extends in a direction from the annular portion to the first member and is located between the two sector-shaped parts; the annular portion is provided with arc-shaped holes corresponding to the columnar portions, and the columnar portions pass through the arc-shaped holes and then enter the through holes; the shaft portion is provided with a limiting hole penetrating along its radial direction, two spherical parts are oppositely arranged in the limiting hole, and the elastic element is provided between the two spherical parts; and the two spherical parts may respectively contact the corresponding sector-shaped parts, and be configured to drive the corresponding sector-shaped parts to rotate around the columnar portions.

Further, the teeth are located on an outer circumferential surface of the annular surface; and the second member defines a chamber, and a part of the first member provided with the teeth is located in the chamber.

Further, the ratchet mechanism further includes an end cover, where the second member is sheathed in the end cover, and a side of the end cover facing the receiving grooves is provided with a plurality of blocking posts, a limiting groove is provided between adjacent ones of the receiving grooves, and the blocking posts are slidable in the corresponding limiting grooves; and each of the receiving grooves receives a drive transmission member, and a part of the drive transmission member is located in the limiting groove, such that the blocking post contacts and drives the drive transmission member when it moves to an end of the limiting groove, so as to make the drive transmission member in a non-working state.

The present application further provides a hand tool, which may be a wrench or a screwdriver. The hand tool includes a handle and the ratchet mechanism described above that is connected to the handle; and the handle is configured to drive the first member or the second member of the ratchet mechanism to rotate under the action of an external force.

The present application has at least the following beneficial technical effects.

In the ratchet mechanism provided by the present application, the different engaged states between the ratchet and the drive transmission members enable an increase of transmission gears, a higher transmission efficiency, less shaking due to precise fitting, and further elimination of an effect of tooth clearance, under the condition of keeping the number of teeth unchanged. During retraction, due to the increase of gears, a smaller retraction angle can be realized, and the strength is guaranteed, which is suitable for a smaller installation space; in addition, the resistance between the ratchet and the pawl during backward rotation is reduced, thus effectively reducing wear and tear.

The concept, specific structures, and technical effects of the present application will be further described below in conjunction with accompanying drawings, such that the objective, features, and effects of the present application can be fully understood.

DETAILED DESCRIPTION OF THE PREFERRED EMBODIMENTS

Figure 1:
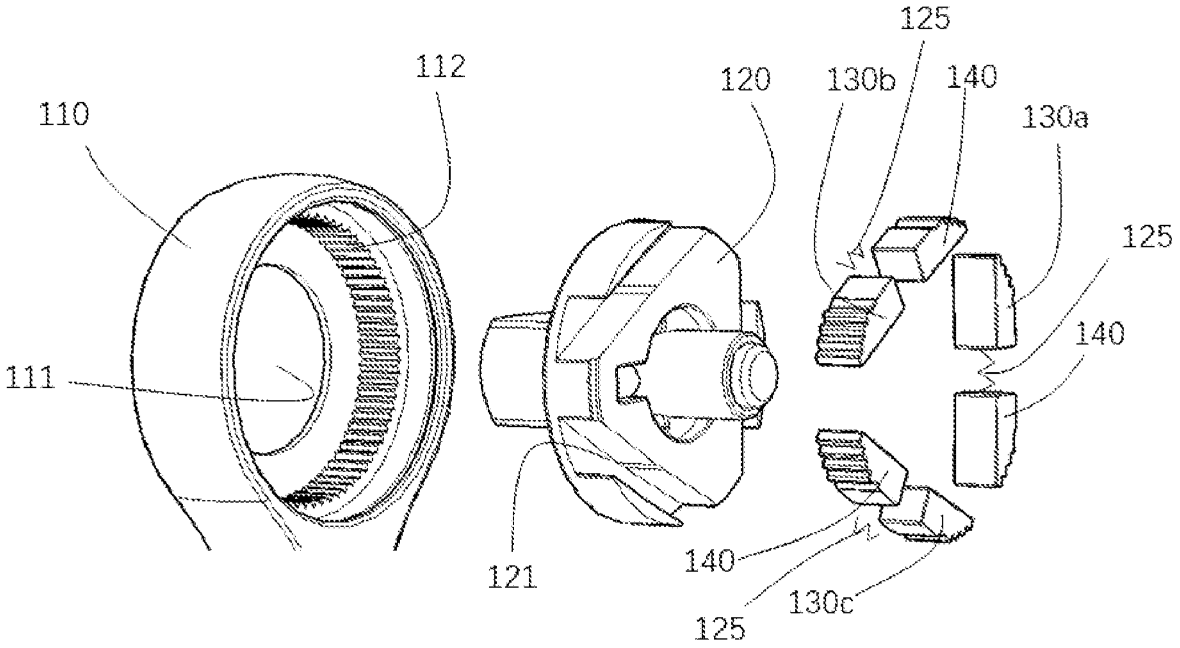
FIG. 1 is an exploded view of an internal structure in Embodiment 1 of the present application.

Preferred embodiments of the present application are described below with reference to the drawings of the specification to make the technical contents clearer and easier to understand. The present application may be embodied through examples of many different forms, and the protection scope of the present application is not limited to the embodiments mentioned herein.

In the drawings, components with the same structure are denoted by the same reference numeral, and components with similar structures or functions are denoted by similar reference numerals. The size and thickness of each component shown in the drawings are arbitrarily shown, and the size and thickness of each component are not limited in the present application. In order to make the illustration clearer, a thickness of a component is appropriately exaggerated in some places of the drawings.

1. Ratchet Mechanism

The present application provides a ratchet mechanism, which includes a first member, a second member and at least two first drive transmission members, where the first member is an annular member, the entire circumferential surface of the first member is provided with teeth, and the teeth may be arranged on the outer circumferential surface or the inner circumferential surface of the first member; and the second member may rotate relative to the circumferential direction of the first member, the second member is used to bear the first drive transmission members, and each of the first drive transmission members has at least one ratchet tooth that may engage with the teeth of the annular member. The first drive transmission members are capable of transmitting motion. Specifically, when an external force acts on the first member to rotate the first member in a first direction, the first member engages with the first drive transmission members, thereby transmitting the motion to the second member, such that the second member rotates in a preset direction. The first direction may be clockwise or counterclockwise. It should be understood that the second member may also be set as an active member, i.e., an external force is applied to the second member to make the second member move in a first direction, and then the motion is transmitted to the first member through the first drive transmission members, such that the first member rotates in a preset direction. During the motion transmission process, each of the first drive transmission members is in different engaged states with the teeth on the first member. Here, the engaged states include at least two kinds of engaged states, in which a first engaged state, i.e., a fully engaged state, means that first drive transmission members are fully engaged with the teeth on the first member, and a second engaged state, i.e., a partially engaged state, means that first drive transmission members are partially engaged with the teeth on the first member. When each of the first drive transmission member is transmitting motion, its engaged state changes periodically with the rotation of the ratchet mechanism.

According to different numbers of first drive transmission members, the partially engaged state may also be subdivided into several situations. For example, in some embodiments, three of the first drive transmission members are used, with the first one of the first drive transmission member being in a fully engaged state, the second one of the first drive transmission members being only one-third engaged with the teeth on the first member, and the third one of the first drive transmission member being only two-thirds engaged with the teeth on the first member. When four of the first drive transmission members are used, the first one of the first drive transmission members is in a fully engaged state, and the remaining three of the first drive transmission members are in partially engaged states, which are respectively one-quarter, one-half, three-quarters engaged with the teeth, and so on.

By arranging each of the first drive transmission members to be in different engaged states, the ratchet mechanism may have more gears, a higher transmission efficiency, and less shaking under the condition of keeping the number of teeth of the first member unchanged, which can better eliminate the tooth clearance, guarantee the strength and improve the movement precision. Also, in a limited space, it is possible to increase the number of gears, realize a smaller retraction angle, and guarantee the strength, such that the ratchet mechanism may be more compact in size and has a good motion transmission effect, thus being applicable to a smaller installation space. At the same time, the resistance of the ratchet mechanism in backward rotation is smaller, which reduces the wear of the ratchet mechanism.

The ratchet mechanism of the present application may be further provided with at least two second drive transmission members, such that when the ratchet mechanism rotates in a second direction, motion transmission can also be realized between the first member and the second member, the second direction being the opposite direction to the first direction. The function of the second drive transmission members is the same as that of the first drive transmission members, and the only difference lies in that the second drive transmission members do not function when rotating in the first direction; and the first drive transmitting members do not function when rotating in the second direction. By providing the first drive transmission members and the second drive transmission members, it is possible to realize a bidirectional function of the ratchet mechanism, and the gears of the ratchet mechanism may be expanded in both directions.

The ratchet mechanism of the present application may be used in hand tools, such as ratchet wrenches, ratchet screwdrivers, and bidirectional wrenches, and may realize continuous rotation of tools in a small narrow space. It should be understood that the ratchet mechanism of the present application may also be used in other tools that are rotated to provide torque, and are not limited to hand tools.

The present application will describe the ratchet mechanism in detail with the following embodiments.

Embodiment 1

FIGS. 1 to 10 show the structure of Embodiment 1.

Figure 2:
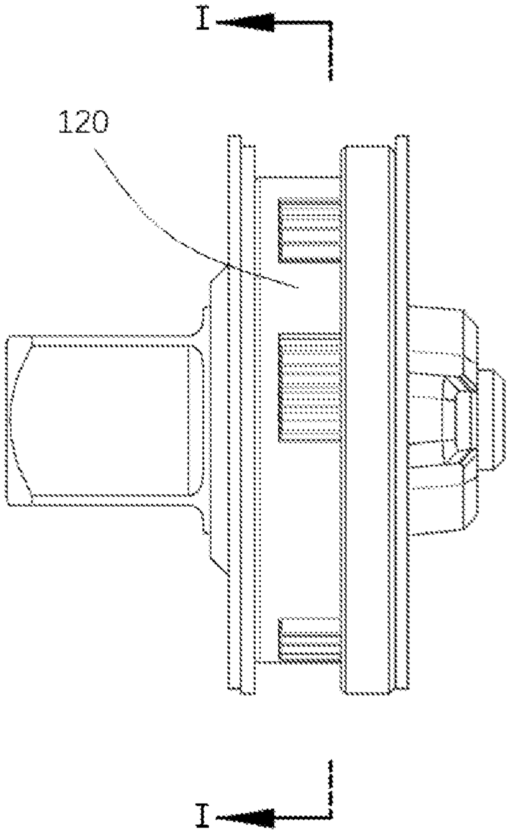
FIG. 2 is a front view of Embodiment 1 of the present application.
Figure 3:
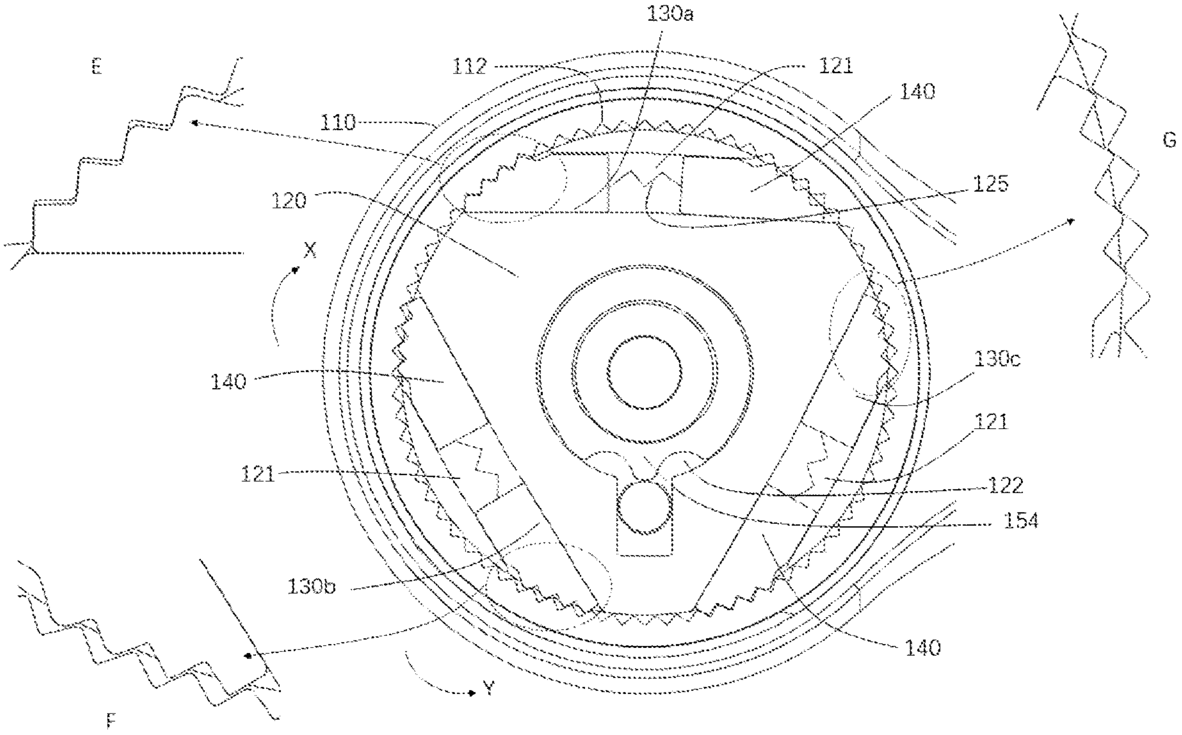
FIG. 3 is a cross-sectional view taken along I-I of FIG. 2.

As shown in FIGS. 1, 2 and 3, in this embodiment, the ratchet mechanism 100 includes a first member 110, a second member 120, and three first drive transmission members 130.

The first member 110 is an annular member, including an annular body with an axially extending through hole that defines a chamber 111. The chamber 111 has a circumferentially extending wall, which faces radially inward of the annular member and is provided with a plurality of teeth 112. The plurality of teeth 112 are parallel to each other, and each tooth 112 may extend in the axial direction of the first member 110, parallel to the axial direction of the first member 110. The teeth 112 may extend from one end of the first member 110 to the other end in the axial direction of the first member 110, or may extend partially, i.e., there is no tooth 112 in a partial area of the wall surface in the axial direction.

Figure 4:
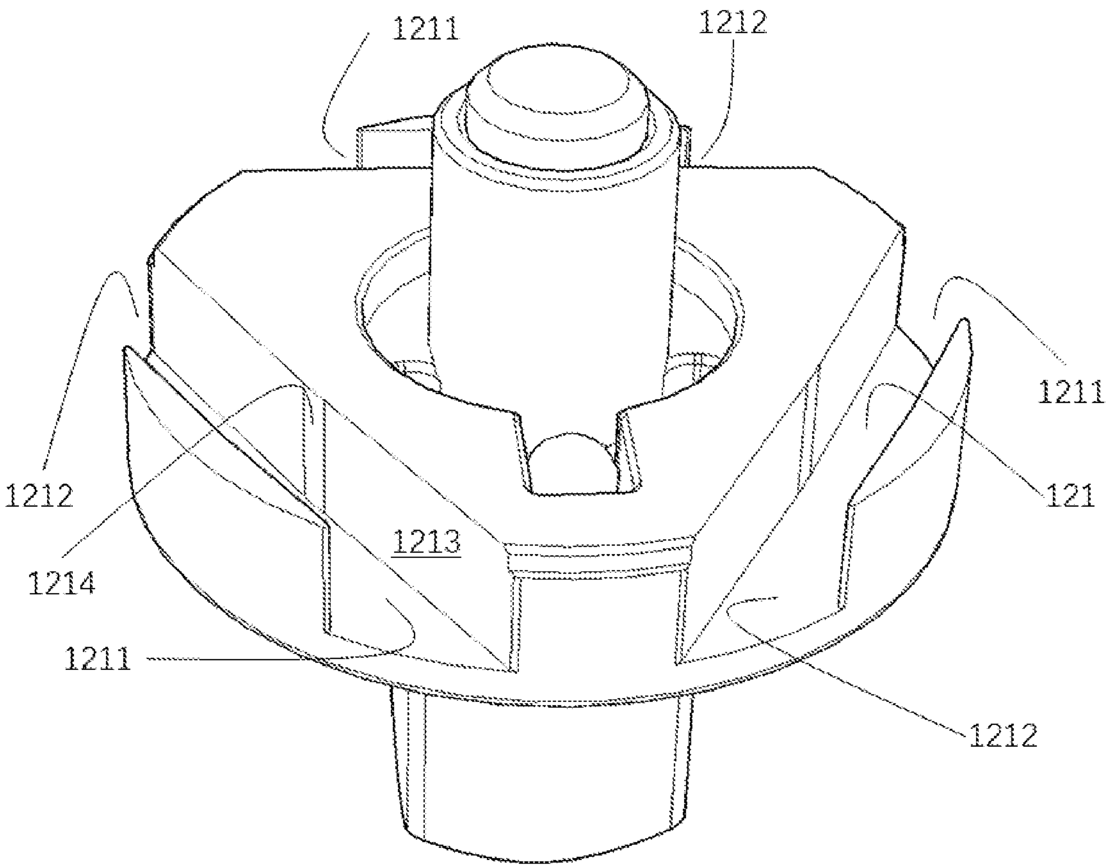
FIG. 4 is a schematic structural view of a second member in Embodiment 1 of the present application.

Referring to FIGS. 1 and 4, the second member 120 is at least partially received in the chamber 111. The second member 120 is provided with three receiving grooves 121 for receiving the first drive transmission members 130, where the three receiving grooves 121 may be evenly distributed along the circumference of the second member 120, and one end of each receiving groove 121 is provided with a first opening 1211 facing the first member 110. Referring to FIG. 3, one of the first drive transmission members 130 is in one of the receiving grooves 121. A part of the first drive transmission member 130 passes through the first opening 1211 and may be engaged with the teeth 112 of the first member 110.

Figure 5:
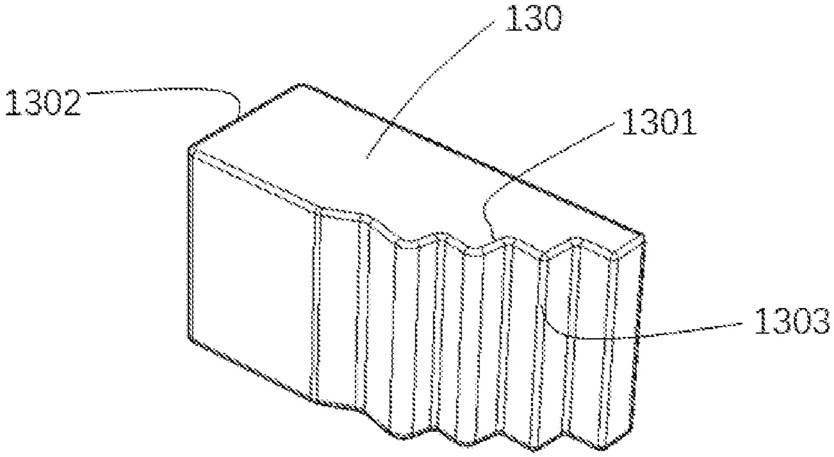
FIG. 5 is a schematic structural view of a drive transmission member in Embodiment 1 of the present application.

As shown in FIG. 5, the first drive transmission member 130 is substantially wedge-shaped and has a first end 1301 and a second end 1302 arranged oppositely, where the first end 1301 is provided with at least one ratchet tooth 1303, and the ratchet tooth 1303 passes through the first opening 1211 and may be engaged with the teeth 112 on the first member 110. In some embodiments, the first end 1301 of the first drive transmission member 130 may be set as an arc-shaped sidewall, the curvature of which is the same as that of the wall of the chamber 111 of the first member 110, and the first end 1301 may be provided with a plurality of ratchet teeth 1303. Referring to FIG. 3, the second end 1302 is arranged in the receiving groove 121. Two opposite side surfaces of the first drive transmission member 130 located between the first end 1301 and the second end 1302 are respectively in contact with a sidewall of the receiving groove 121, such that the first drive transmission member 130 is supported by the receiving groove 121.

In this embodiment, as shown in FIG. 3, the first member 110 is an active member, i.e., an external force acts on the first member 110, such that the first member 110 may move in a first direction X. At this time, through the first drive transmission members 130, the motion is transmitted to the second member 120, such that the second member 120 rotates in a preset direction. The preset direction may be the same direction as the first direction X, or may be an opposite direction to the first direction X, which depends on the engaging direction between the first drive transmission members 130 and the first member 110. Here, the preset direction is set to be the same as the first direction X. When the first member 110 is driven in a direction opposite to the first direction X, the first drive transmission members 130 no longer transmit motion, and their ratchet teeth 1303 slide relatively along the teeth 112 of the first member 110, and the second member 120 remains in a stationary state, so the backward rotation of the ratchet mechanism 100 is realized.

The engaged states of the three first drive transmission members 130 with the teeth 112 of the first member 110 are different, respectively. As shown in FIG. 3, when the first member 110 is driven in the first direction X, the first drive transmission member 130*a* is fully engaged with the teeth 112 of the first member 110, i.e., in a first state E; the first drive transmission member 130*b* is two-thirds engaged with the teeth 112 of the first member 110, i.e., in a second state F; and the first drive transmission member 130*c* is one-third engaged with the teeth 112 of the first member 110, i.e., in a third state G. As the first member 110 continues to rotate, the first drive transmission member 130*a* becomes one-third engaged, i.e., the third state G; the first drive transmission member 130*b* becomes fully engaged, i.e., the first state E; the first drive transmission member 130*c* becomes two-thirds engaged, i.e., the second state F; so back and forth.

By arranging the three first drive transmission members 130 to be in different engaged states, it is possible to increase the number of gears of the ratchet mechanism 100 without increasing the number of teeth 112 of the first member 110, thereby improving the transmission efficiency and fitting precision, thus reducing shaking. It is well known that the higher the number of teeth of the first member 110, the higher the transmission precision will be. Correspondingly, the thickness of each tooth 112 will be reduced, resulting in insufficient strength, so it is easy to wear or break, thus making the ratchet mechanism 100 ineffective. However, if the number of teeth 112 needs to be reduced in order to increase the strength, the transmission precision will decrease. With the ratchet mechanism 100 of the present application, it is possible to increase the number of gears and improve the transmission precision while guaranteeing the strength. For example, in this embodiment, the number of teeth of the first member 110 is set to 72. With the three first drive transmission members 130 arranged as above, the number of gears is changed to 216, which makes the fit more precise, effectively reduces the shaking, plays a role in eliminating the tooth clearance, and has a smaller resistance during backward rotation. If four first drive transmission members 130 are provided, the number of gears may be changed to 288, and so on.

Figure 6:
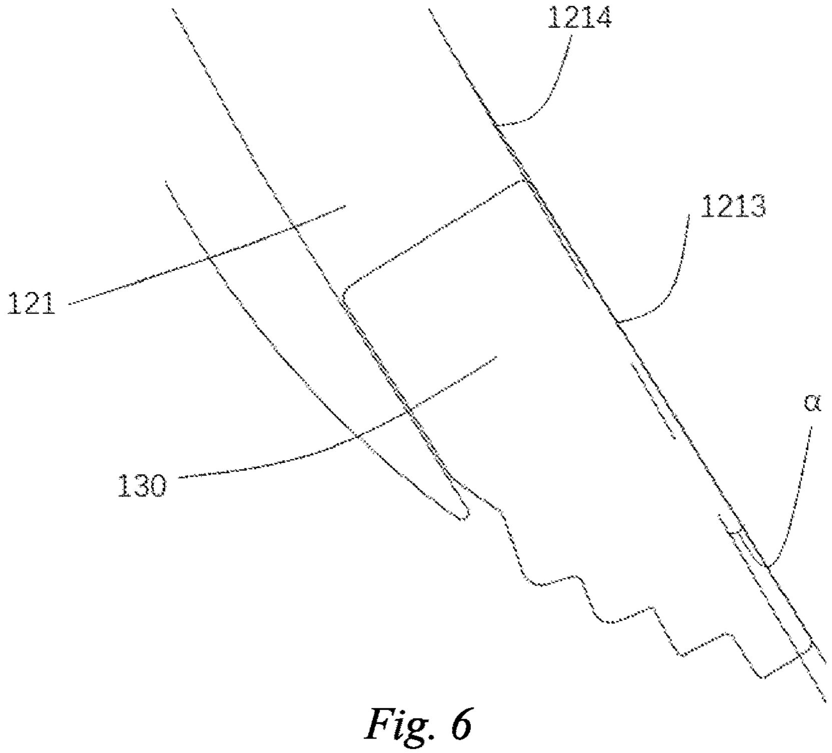
FIG. 6 is a schematic view showing an advance angle of a drive transmission member in Embodiment 1 of the present application.

As described above, the first drive transmission members 130 are arranged in the receiving grooves 121 of the second member 120 and are supported by the receiving grooves 121. In order to ensure that the ratchet teeth 1303 of the first drive transmission members 130 are at different advance angles, i.e., each of the first drive transmission members 130 is in different engaged states with the teeth 112 of the first member 110, contact surfaces 1213 of the receiving grooves 121 in contact with the first drive transmission members 130 may be designed to have different plane slopes. Specifically, as shown in FIG. 4 and FIG. 6, structural diagrams of the receiving grooves 121 where the first drive transmission members 130 are located are shown. There is a reference surface 1214 in the middle of a sidewall of the receiving grooves 121. The contact surface 1213 of the receiving grooves 121 with the first drive transmission member 130 is inclined by an angle $\alpha$ with respect to the reference surface 1214. The structures of the receiving grooves 121 where the remaining first drive transmission members 130 are located are similar. The contact surface 1213 of each receiving groove 121 with the corresponding first drive transmission member 130 is inclined by an angle $\alpha$. However, the inclination angles $\alpha$ for the contact surfaces 1213 of the three receiving grooves 121 are different, and the specific values of the angles $\alpha$ may be set according to the advance angles required for the corresponding first drive transmission members 130.

What has been described above is the structure when the ratchet mechanism 100 is driven in only one direction (i.e., the first direction X).

In order to realize bidirectional transmission of the ratchet mechanism 100, a group of second drive transmission members 140 may be added to the ratchet mechanism 100, including three second drive transmission members 140. As shown in FIG. 3, the second drive transmission member 140 has substantially the same shape as the first drive transmission member 130, and is arranged in the receiving groove 121. A ratchet teeth on the second drive transmission member passes through a second opening 1212 of the receiving groove 121, and may be engaged with the teeth 112 on the first member 110, which will not be repeated here. When an external force acts on the first member 110 to move the first member 110 in a second direction Y (which is an opposite direction to the first direction X), through the second drive transmission members 140, the motion is transmitted to the second member 120, such that the second member 120 rotates in a preset direction. The preset direction may be the same direction as the second direction Y, or may be an opposite direction to the second direction Y, which depends on the engaging direction between the second drive transmission members 140 and the first member 110. Here, the preset direction is set to be the same as the second direction Y. When the first member 110 is driven in a direction opposite to the second direction Y, the second drive transmission members 140 no longer transmit motion, and their ratchet teeth 1303 slide relatively along the teeth 112 of the first member 110, and the second member 120 remains in a stationary state, so the backward rotation of the ratchet mechanism 100 is realized. Similar to the first drive transmission members 130, the second drive transmission members 140 also have different engaged states with the teeth 112 of the first member 110, and the engaged state of each second drive transmission member 140 is changed in a back-and-forth way with the rotation of the first member 110. For the second drive transmission members 140, different engaged states are realized also through different inclination angles of the contact surfaces 1213 of the receiving grooves 121, which are the same as those shown in FIG. 6, and will not be repeated here.

Figure 7:
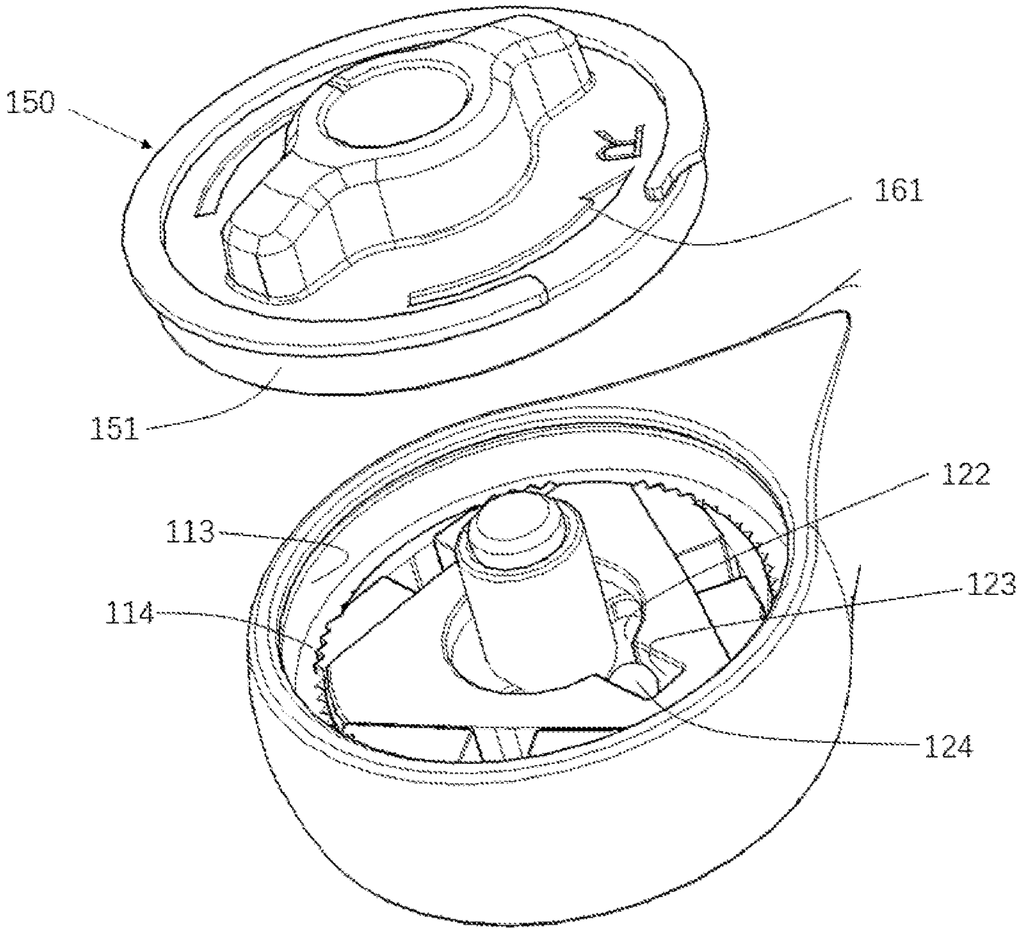
FIG. 7 is a schematic exploded view of Embodiment 1 of the present application, showing an end cover.

Referring to FIG. 7, in order to switch the rotation direction of the ratchet mechanism 100, this embodiment further includes a switching component 150. When the switching component 150 is in a first position, the ratchet mechanism 100 rotates forward, i.e., the first member 110 is driven to move in the first direction X, and the first drive transmission members 130 work to transmit the motion to the second member 120. In this case, the second drive transmission members 140 do not work. When the switching component 150 is in a second position, the ratchet mechanism 100 rotates backward, i.e., the first member 110 is driven to move in the second direction Y, and the second drive transmission members 140 work and transmit the motion to the second member 120. In this case, the first drive transmission members 130 do not work.

Figure 3A:
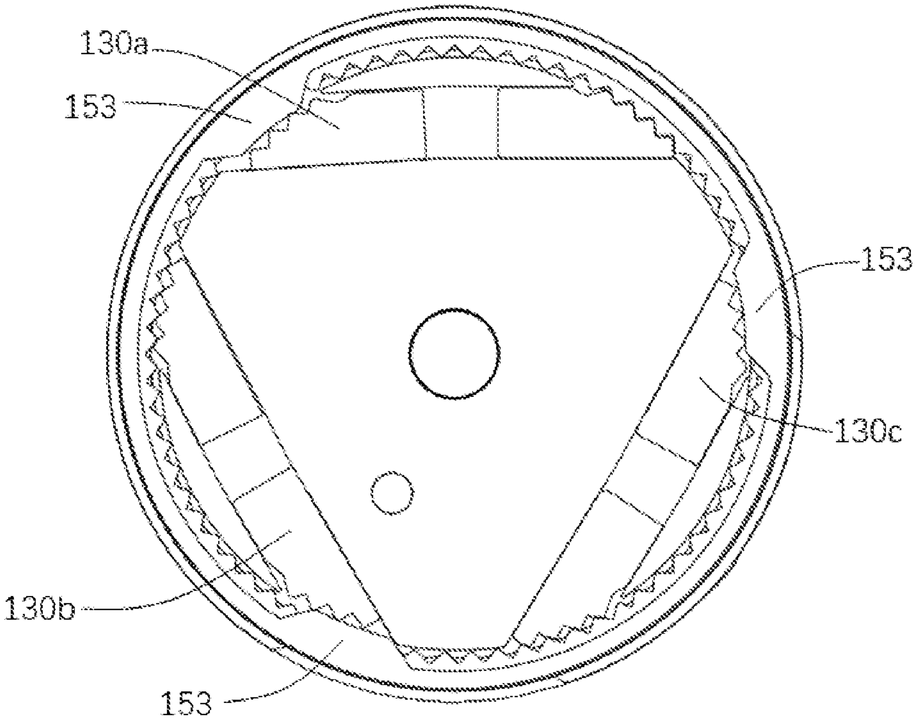
FIG. 3*a* is a schematic view in which first drive transmission members blocked by locking pieces in Embodiment 1 of the present application.
Figure 3B:
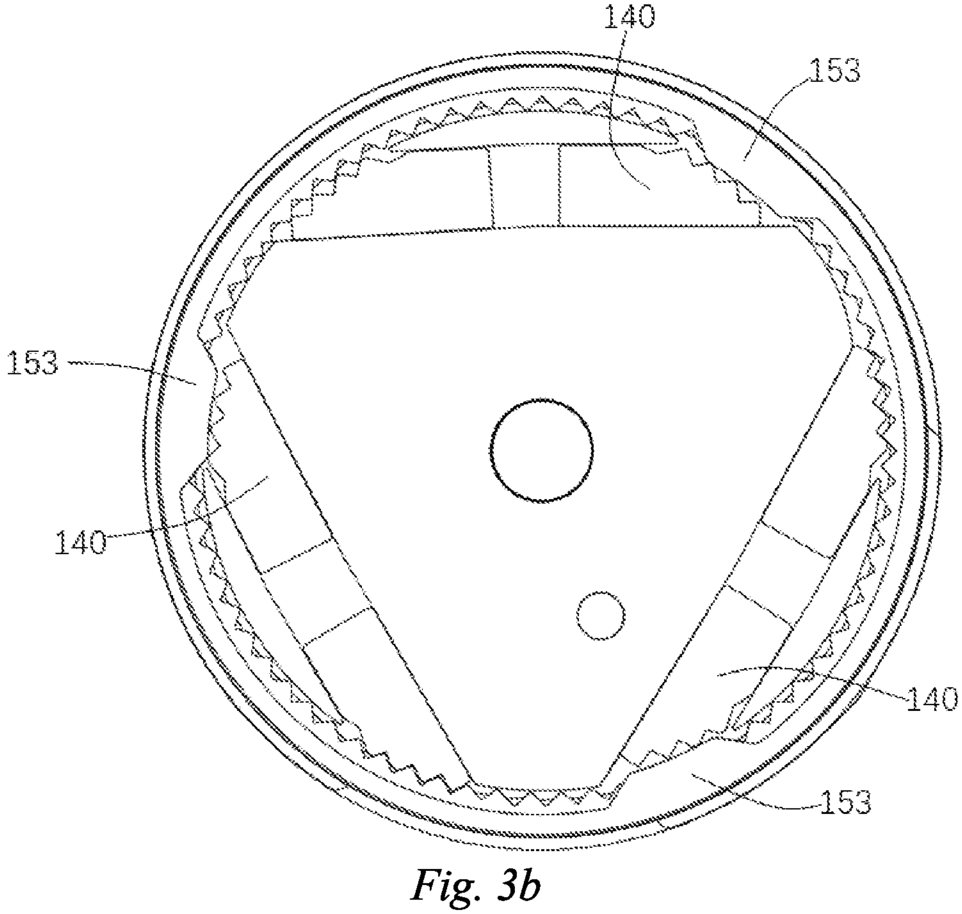
FIG. 3*b* is a schematic view in which second drive transmission members blocked by locking pieces in Embodiment 1 of the present application.
Figure 8:
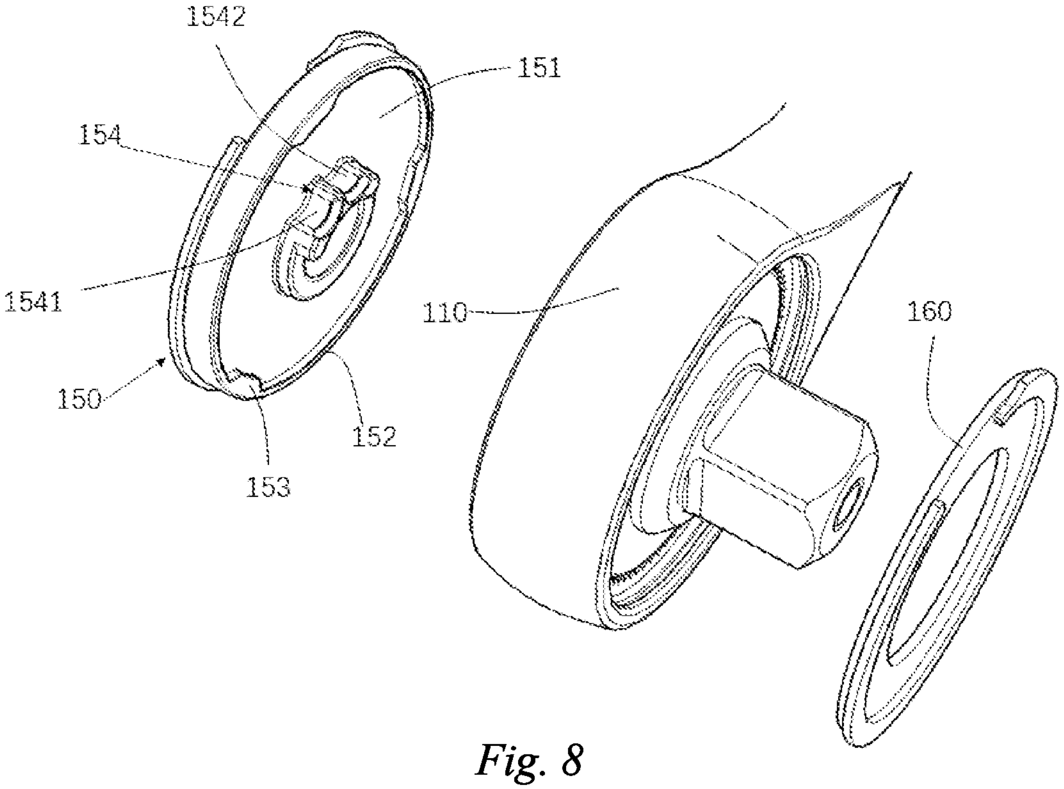
FIG. 8 is a schematic exploded view of Embodiment 1 of the present application, showing a back side of the end cover.
Figure 9:
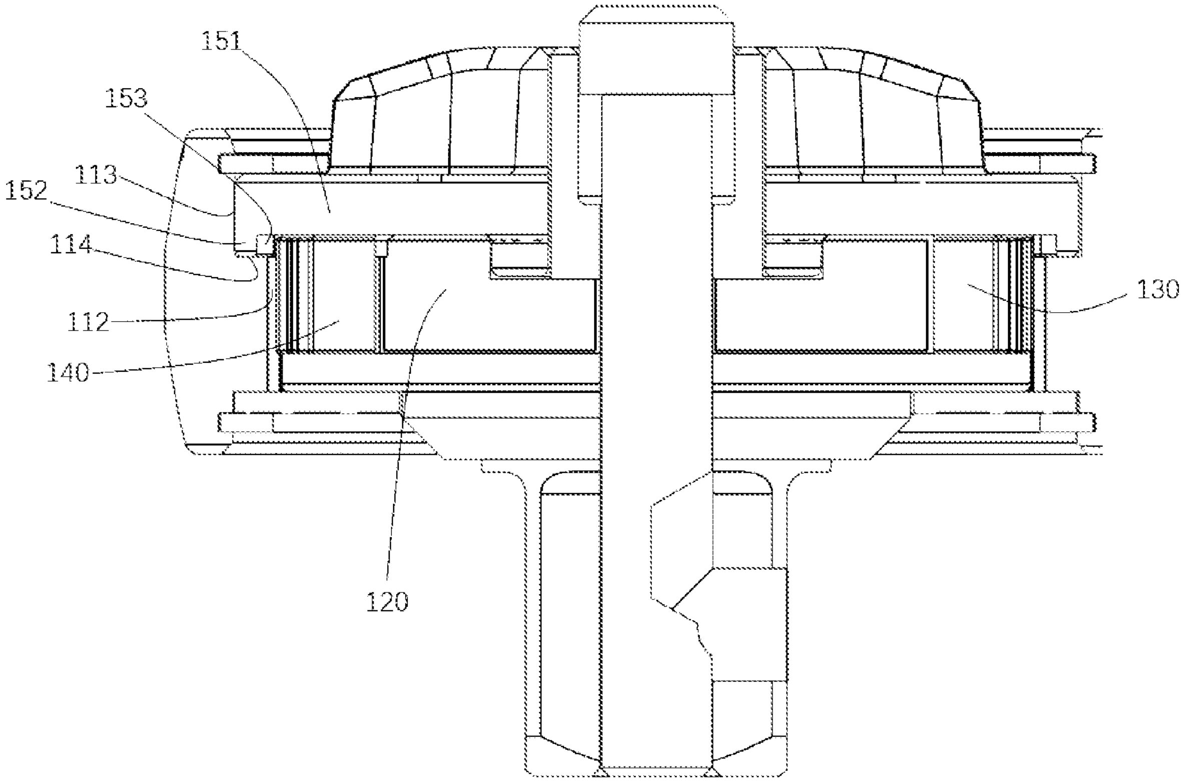
FIG. 9 is a sectional view of Embodiment 1 of the present application.
Figure 10:
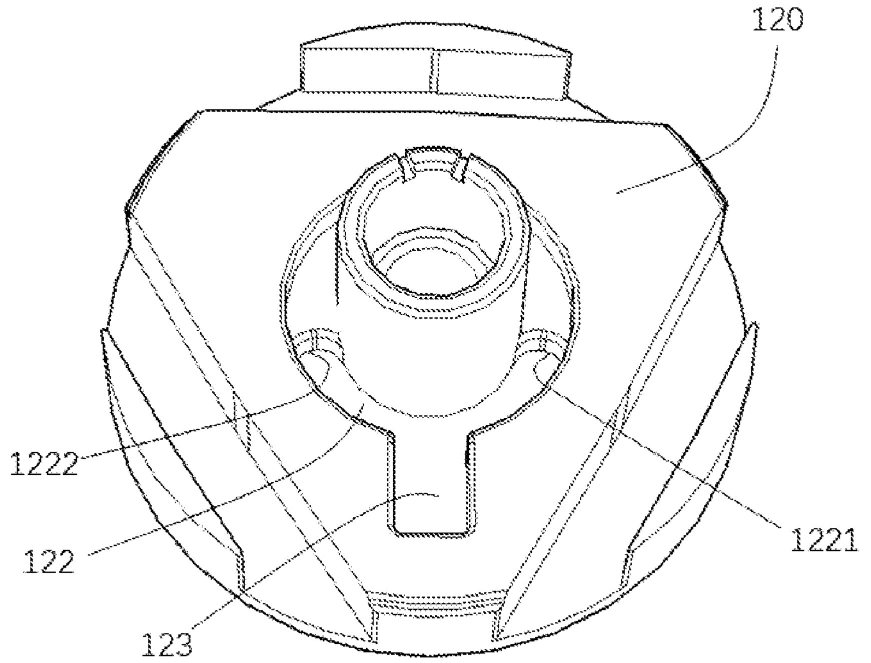
FIG. 10 is a schematic view showing a limiting groove of a second member in Embodiment 1 of the present application.

As shown in FIG. 7, the switching component 150 includes an end cover 151. The first member 110 includes an annular portion 113. The annular portion 113 is located at an axial end of the chamber 111. The end cover 151 may cooperate with the annular portion 113, so as to be located at the end of the chamber 111. The inner diameter of the annular portion 113 is different from that of the chamber 111, such that a stepped surface 114 is formed on the upper portion of the teeth 112. Referring to FIGS. 8 and 10, the circumferential edge of a side surface of the end cover 151 facing the teeth 112 protrudes toward the second member 120 to form an annular protrusion 152. The protrusion 152 further protrudes in the radial direction of the end cover 151 to form blocking pieces 153 corresponding to the drive transmission members. When the end cover 151 is located at the end of the chamber 111, the protruding portion 152 is located above the stepped surface 114. A side of a drive transmission member facing the end cover 151 is higher than the height of the teeth 112 in the axial direction of the chamber 111, such that the blocking piece 153 may be located between the drive transmission member and the annular portion 113. As shown in FIG. 3*a* and FIG. 3*b*, when the end cover 151 is rotated to a first position, the blocking pieces 153 face and contact the second drive transmission members 140, so that the second drive transmission members 140 are disengaged from the teeth 112. In this case, the second drive transmission members 140 no longer function when the ratchet mechanism 100 rotates in the first direction X, while the first drive transmission members 130 are engaged with the teeth 112 of the first member 110 to realize motion transmission. When the end cover 151 is rotated to a second position, the blocking pieces 153 face and contact the first drive transmission members 130, so that the first drive transmission members 130 are disengaged from the teeth 112. In this case, the first drive transmission members 130 no longer function when the ratchet mechanism 100 rotates in the second direction Y, while the second drive transmission members 140 are engaged with the teeth 112 of the first member 110 to realize motion transmission.

First elastic elements 125 are provided between the first drive transmission members 130 and the second drive transmission members 140 to restore the drive transmission members in position after the drive transmission members are disengaged from the blocking pieces 153. Specifically, when the blocking pieces 153 are in contact with the first drive transmission members 130 or the second drive transmission members 140, the first elastic elements 125 are compressed to exert elastic forces on the first drive transmission members 130 and the second drive transmission members 140.

There is also a third position for the end cover 151. In the third position, the blocking pieces 153 are not in contact with the first drive transmission members 130 and the second drive transmission members 140, so the first drive transmission members 130 and the second drive transmission members 140 are both engaged with the teeth 112 of the first member 110, and they are in an interference state and no longer transmit motion.

Referring to FIGS. 7, 8 and 10, the end cover 151 is provided with a limiting portion 154 in the middle of a side surface facing the chamber 111. A limiting groove 122 is provided on the second member 120 at a position corresponding to the limiting portion 154. The shape of the limiting groove matches the movement trajectory of the limiting portion 154 along with the rotation of the end cover 151. The limiting portion 154 extends into the limiting groove 122. When the end cover 151 is rotated, the limiting portion 154 can slide along the limiting groove 122. When the limiting portion 154 moves to one of the two ends of the limiting groove 122, the limiting portion 154 is blocked by the limiting groove 122, thereby preventing the end cover 151 from continuing to move, so as to achieve the purpose of controlling the rotational stroke of the end cover 151. Specifically, when the limiting portion 154 moves to a first end 1221 of the limiting groove 122, the end cover 151 is in a first position, and the blocking pieces 153 disengage the second drive transmission members 140 from the teeth 112. When the limiting portion 154 moves to a second end 1222 of the limiting groove 122, the end cover 151 is in a second position, and the blocking pieces 153 disengage the first drive transmission members 130 from the teeth 112. The limiting portion 154 is a structure protruding from the end cover 151 toward the chamber 111, and one end of the limiting portion 154 extends into the limiting groove 122.

The ratchet mechanism 100 also includes a locking component to lock the ratchet mechanism 100 in a first position or a second position. As shown in FIGS. 7, 8 and 10, the second member 120 is provided with a locking groove 123. One end of the locking groove 123 communicates with the middle of the limiting groove 122, and a locking ball 124 is arranged in the locking groove 123. The limiting portion 154 includes a first recess 1541 and a second recess 1542 arranged in series, and the first recess 1541 and the second recess 1542 are both recessed in the radial direction of the end cover 151. When the end cover 151 is in the first position, the first recess 1541 faces the locking groove 123, and the locking ball 124 slides into the first recess 1541, thereby locking the end cover 151 in the first position; and when the end cover 151 is in the second position, the second recess 1542 faces the locking groove 123, and the locking ball 124 slides into the second recess 1542. A second elastic element 126 (see FIG. 11) is provided between the locking ball 124 and an end of the locking groove 123 away from the limiting groove 122. Elastic forces may be exerted on the locking ball 124 when the locking ball 124 enters the first recess 1541 or the second recess 1542. When a connecting part between the first recess 1541 and the second recess 1542 faces the locking groove 123, the locking ball 124 is blocked in the locking groove 123 by the connecting part, so the end cover 151 is in a third position.

The ratchet mechanism 100 further includes a tail cover 160. The tail cover 160 is provided at an end of the chamber 111 of the first member 110 opposite to the end cover 151, and seals the chamber 111 together with the end cover 151 for protection.

A direction indicator 161 may also be provided on the end cover 151 to show the current rotation direction of the ratchet mechanism 100.

This embodiment describes a ratchet mechanism 100 that can move in two directions, and when moving in each direction, there is a group of drive transmission members acting, which can increase the number of transmission gears without increasing the number of teeth. With the switching component 150, the movement direction can be switched, so as to realize the bidirectional function.

Embodiment 2

Figure 11:
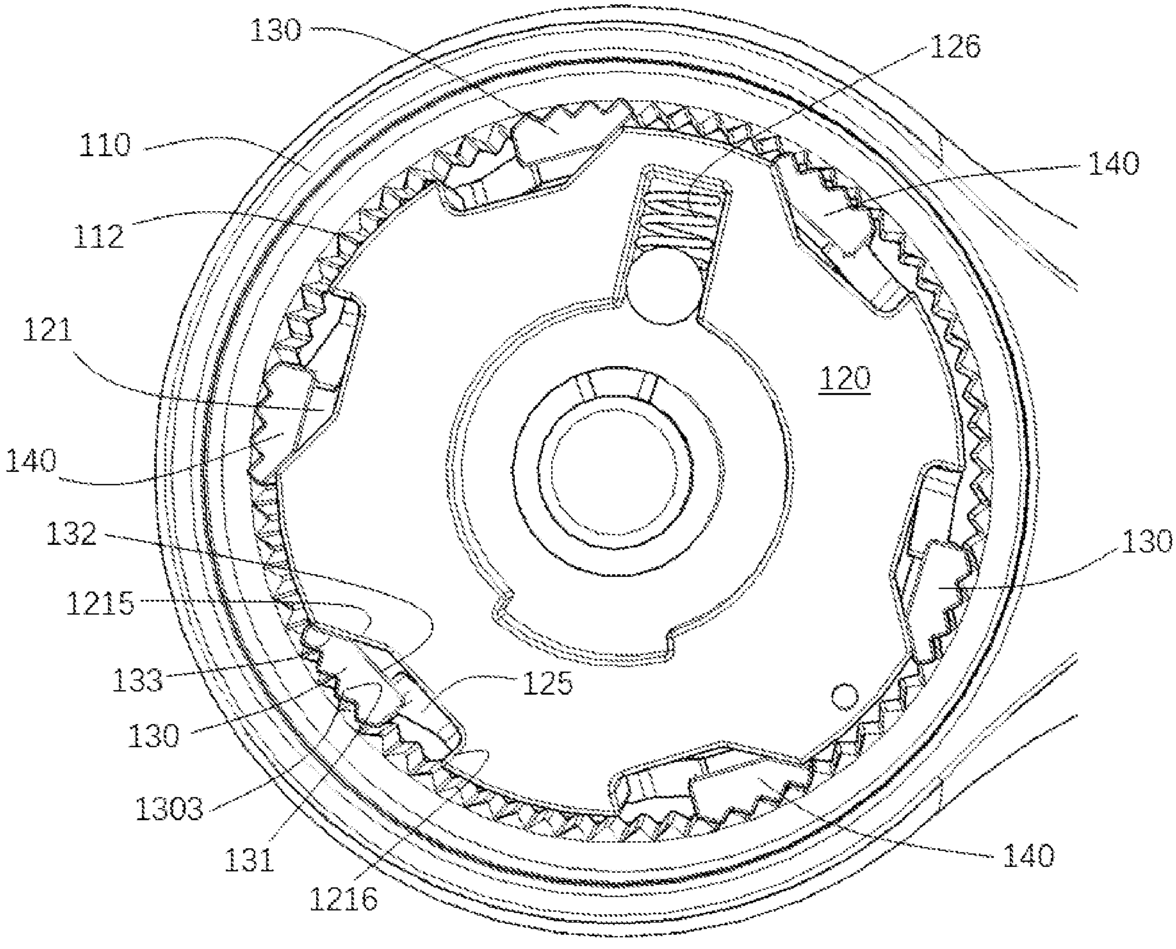
FIG. 11 is a schematic structural view of Embodiment 2 of the present application.

FIG. 11 shows a main structure of Embodiment 2. Most of the features in this embodiment are the same as those in Embodiment 1, and only the differences between the two embodiments will be described below.

As shown in FIG. 11, the second member 120 is a substantially annular member, and six receiving grooves 121 are distributed in the circumferential direction on its circumferential sidewall. Each receiving groove 121 is provided with a drive transmission member. Three driving transmission members serves as the first drive transmission members 130, and the other three drive transmission members serves as the second drive transmission members 140. The first drive transmission members 130 and the second drive transmission members 140 are evenly distributed in a staggered manner along the circumference of the second member 120.

The structures of the drive transmission members are substantially the same, and one of the first drive transmission members 130 is taken as an example for detailed description below. The first drive transmission member 130 has a first side surface 131 and a second side surface 132 arranged oppositely. The first side surface 131 faces the first member and is provided with at least one ratchet tooth 1303, which can be engaged with the teeth 112 on the first member 110. The second side surface 132 is located in the receiving groove 121. An inclined surface 133 connects the first side surface 131 and the second side surface 132, and the inclined surface 133 is in contact with a sidewall of the receiving groove 121.

The structures of the receiving grooves 121 are basically the same, and one of them is taken as an example for detailed description below. The receiving groove 121 includes a first sidewall 1215 and a second sidewall 1216 arranged oppositely along the circumference of the second member 120. The first sidewall 1215 is arranged obliquely, i.e., there is an included angle between the first sidewall 1215 and the radial direction of the second member 120. The first sidewall 1215 is in contact with the inclined surface 133 of the first drive transmission member 130 to support the first drive transmission member 130. It should be noted that the first sidewall 1215 of each receiving groove 121 is inclined at a different angle relative to the radial direction of the second member 120, so that a corresponding drive transmission member has a different advance angle. Therefore, the drive transmission members are in different engaged states with the teeth 112 of the first member 110. The engaged states are the same as those in Embodiment 1, which will not be repeated here.

A first elastic element 125 is also connected to an end of each drive transmission member opposite to the inclined surface 133, and the other end of the elastic element 125 is connected to the receiving groove 121, which can exert an elastic force on the drive transmission member, and the effect is the same as that in Embodiment 1, i.e., the drive transmission member is restored to a position where it is engaged with the first member 110.

This embodiment is the same as Embodiment 1, the ratchet mechanism can move in two directions, and when moving in each direction, there is a group of drive transmission members acting, which can increase the number of transmission gears without increasing the number of teeth. With the same switching component as in Embodiment 1, the movement direction can be switched, so as to realize the bidirectional function.

Embodiment 3

FIGS. 12 to 15 show the structure of Embodiment 3.

Figure 12:
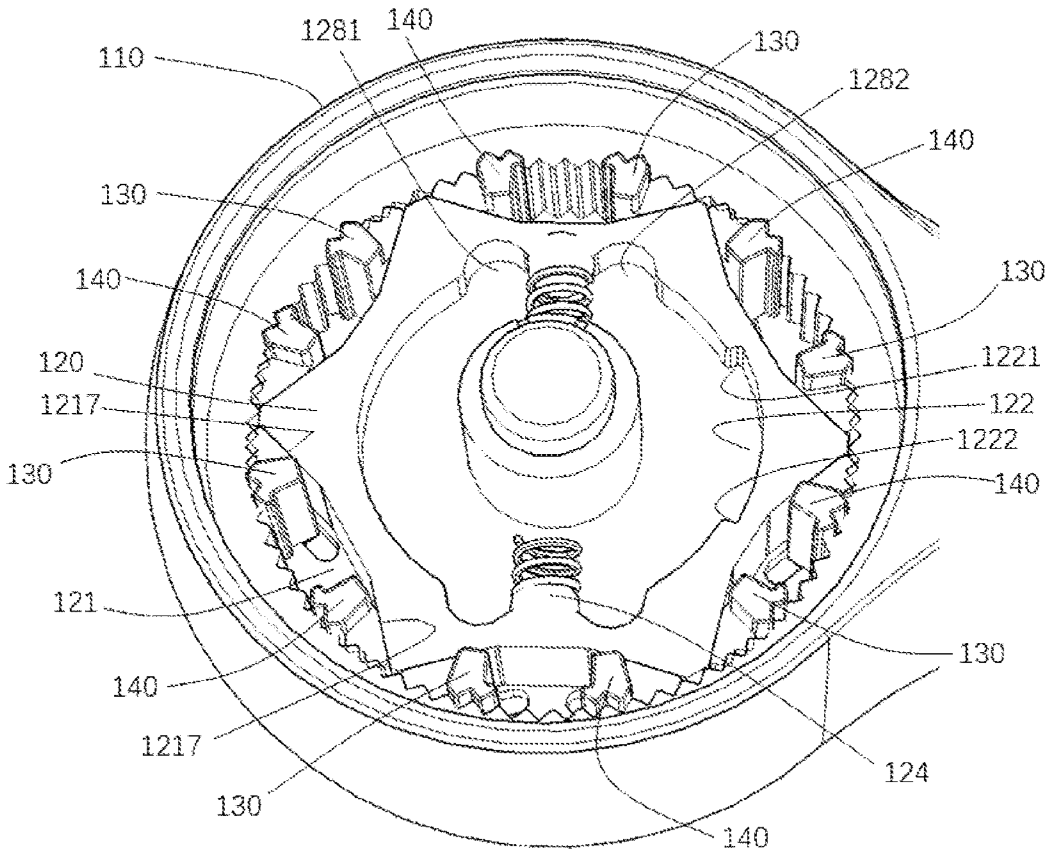
FIG. 12 is a schematic structural view of Embodiment 3 of the present application.

As shown in FIG. 12, compared with Embodiment 1 and Embodiment 2, in this embodiment, the number of drive transmission members is expanded, and a total of twelve drive transmission members are provided, of which six drive transmission members serves as the first drive transmission member 130, and the other six drive transmission members serves as the second drive transmission member 140.

The second member 120 has an axially extending sidewall, and six receiving grooves 121 are provided in the sidewall for receiving the drive transmission members. One first drive transmission member 130 and one second drive transmission member 140 are arranged in one receiving groove 121, which are located at both ends of the receiving groove 121, respectively. A side surface 1217 of the receiving groove 121 that is in contact with the drive transmission member is an inclined surface.

Figure 13:
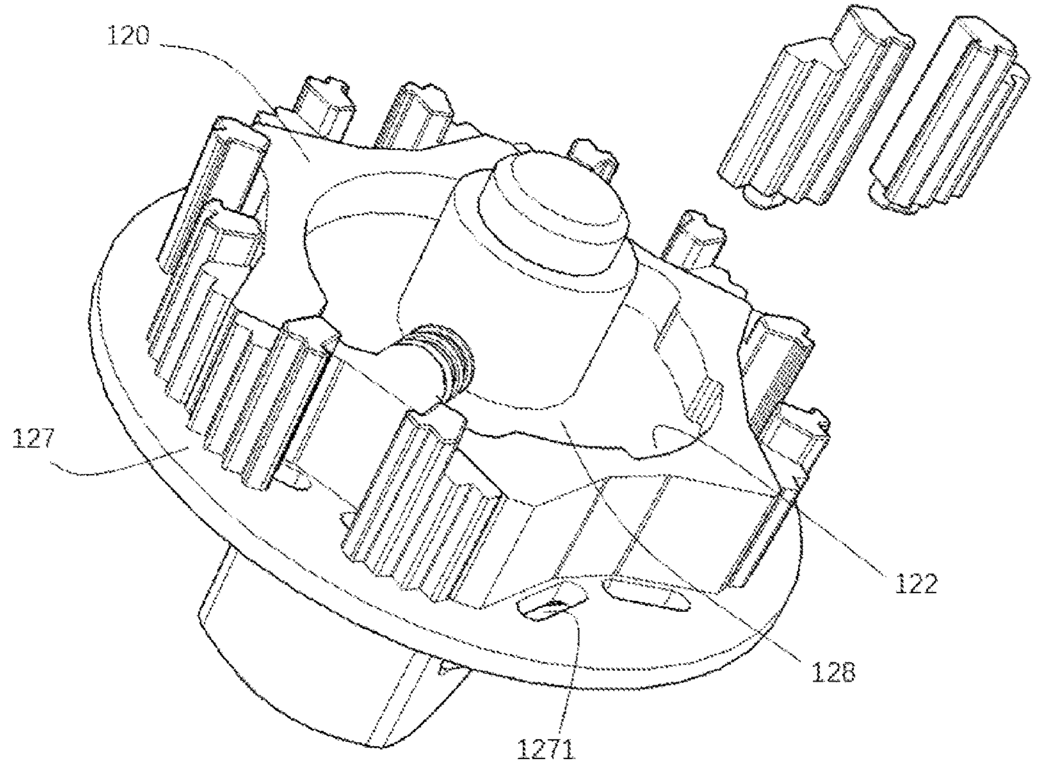
FIG. 13 is a schematic structural view of a second member in Embodiment 3 of the present application.

As shown in FIG. 13, an annular support 127 is further provided at an axial end of the second member 120, which may be integrally formed with the second member 120 or may be a separate component fixed on the second member 120. A through hole 1271 is provided in the annular support 127 at a position corresponding to each drive transmission member. One end of the drive transmission member extends into the through hole 1271 and can slide in the length direction of the through hole 1271. Each through hole 1271 is inclined in its length direction relative to the radial direction, and its inclination angle is substantially the same as the inclination angle of the corresponding inclined surface of the receiving groove 121. For each inclined surface and a corresponding through hole 1271, the inclination angle is set to be different, so that the drive transmission members have different advance angles, so as to achieve different engaged states with the teeth of the first member 110. The concept of the engaged states is the same as that of Embodiment 1, i.e., one of the first drive transmission members 130 is fully engaged, and the other first drive transmission members 130 are partially engaged, but the contact areas are different; and the same is true for the second drive transmission members 140.

It should be understood that the structure of the second member 120 supporting the drive transmission members in this embodiment may also be applied to Embodiment 1 and Embodiment 2, but the numbers of the receiving grooves 121 and the through holes 1271 need to be correspondingly reduced.

The structure of the switching component 150 in this embodiment is also different from that in Embodiment 1 and Embodiment 2.

Figure 14:
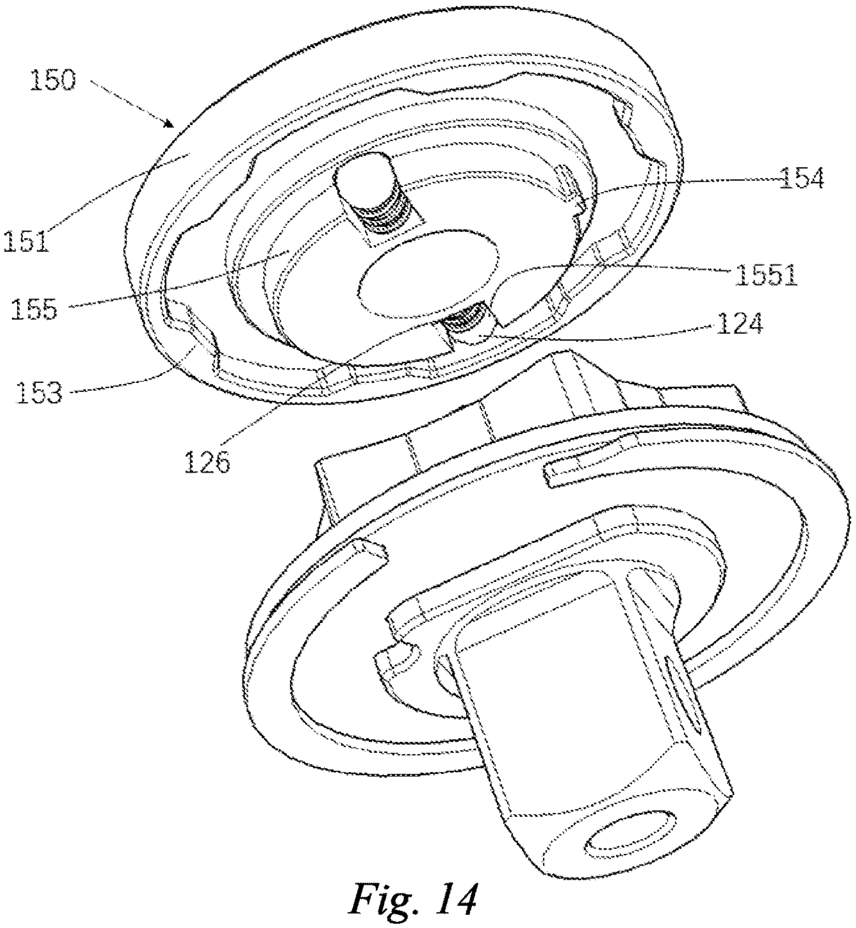
FIG. 14 is a schematic exploded view of an end cover and a second member of Embodiment 3 of the present application.
Figure 15:
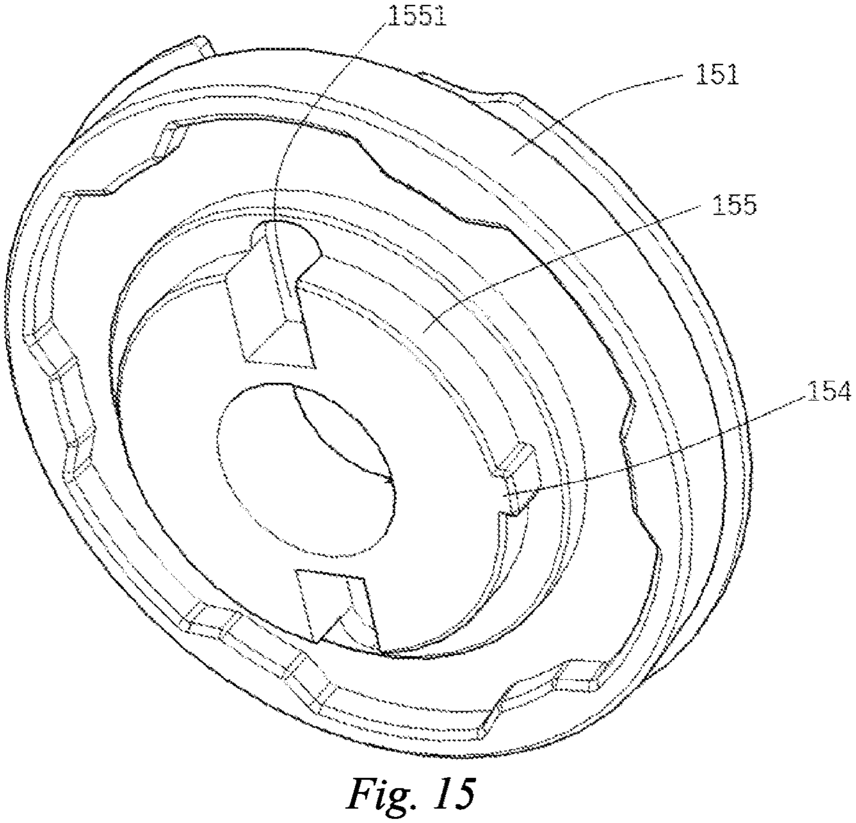
FIG. 15 is a schematic structural view of an end cover of Embodiment 3 of the present application.

As shown in FIG. 14 and FIG. 15, the switching component 150 includes an end cover 151. The end cover 151 includes blocking pieces 153. The arrangement and function of the blocking pieces 153 are the same as those in Embodiment 1, and the only difference lies in that the number of the blocking pieces 153 is six to match the number of the drive transmission members in this embodiment. A circular boss 155 is provided on a side surface 1217 of the end cover 151 facing the second member 120, and a corresponding circular recessed portion 128 is provided in the second member 120. When the end cover 151 is arranged at an end of the second member 120, the circular boss 155 is located in the circular recessed portion 128, and when the end cover 151 is rotated, the circular boss 155 may be rotated in the circular recessed portion 128. The sidewall of the circular boss 155 of the end cover 151 protrudes radially outward to form a limiting portion 154, and the circumferential sidewall of the circular recessed portion 128 is radially recessed to form a limiting groove 122. When the circular boss 155 is rotated, the limiting portion 154 is located in the limiting groove 122 and slides along the limiting groove 122. When the limiting portion 154 moves to one of the two ends of the limiting groove 122, the limiting portion 154 is blocked by the end of the limiting groove 122, thereby preventing the end cover 151 from continuing to move, so as to achieve the purpose of controlling the rotational stroke of the end cover 151.

As shown in FIG. 13, the circumferential sidewall of the circular recessed portion 128 is provided with a first groove 1281 and a second groove 1282. As shown in FIG. 15, the circular boss 155 is provided with a transverse groove 1551, and the opening of the transverse groove 1551 is provided in the circumferential sidewall of the circular boss 155. A locking ball 124 is provided in the transverse groove 1551, and an elastic element 126 is provided between the locking ball 124 and the sidewall of the transverse groove 1551. When the circular boss 155 is rotated to a first position, the opening of the transverse groove 1551 communicates with the first groove 1281, and the locking ball 124 enters the first groove 1281 under the action of the elastic element 126, thereby locking the end cover 151 in the first position. When the circular boss 155 is rotated to a second position, the opening of the transverse groove 1551 communicates with the second groove 1282, and the locking ball 124 enters the second groove 1282 under the action of the elastic element 126, thereby locking the end cover 151 in the second position. When the opening of the transverse groove 1551 faces a connection part between the first groove 1281 and the second groove 1282 (see FIG. 12), the locking ball is still located in the transverse groove 1551, and the end cover 151 is located at a third position.

The first groove 1281, the second groove 1282, the locking ball and the transverse groove 1551 mentioned above may be provided in only one group, or may be provided in two groups as shown in the figures to enhance the locking strength.

It should be understood that the switching component in this embodiment may also be applied to Embodiment 1 and Embodiment 2.

Compared with Embodiment 1 and Embodiment 2, in this embodiment, the number of drive transmission members is expanded, and there are more gears.

Embodiment 4

Figure 16:
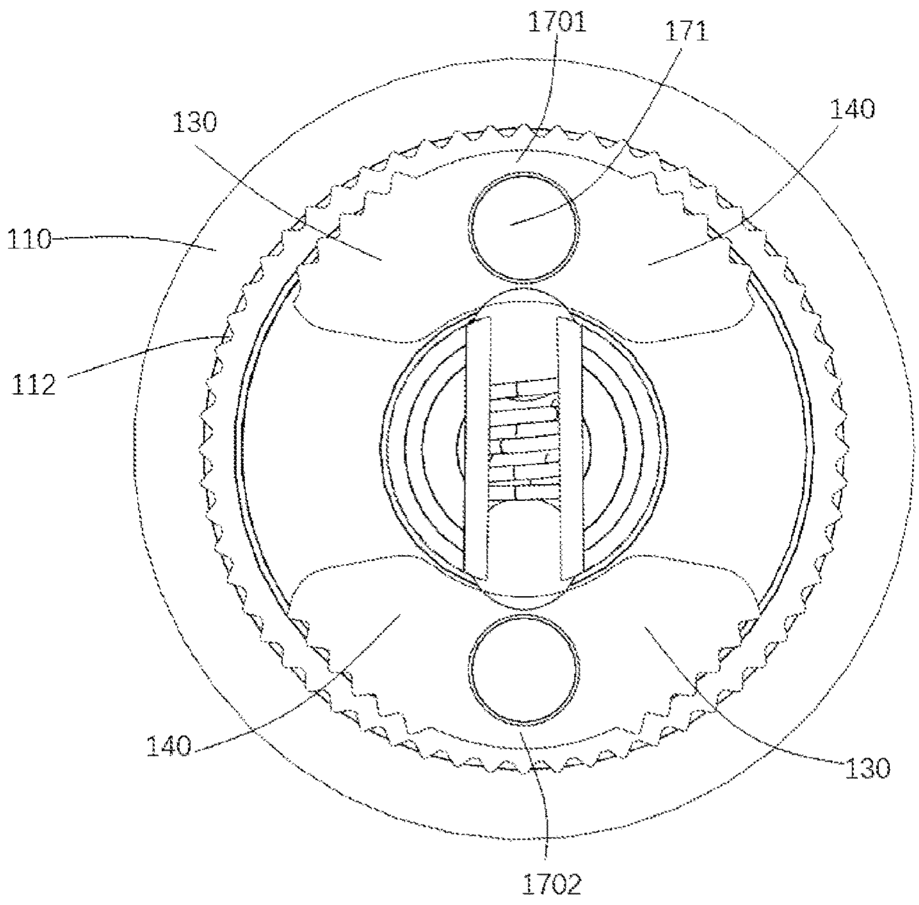
FIG. 16 is a schematic structural view of Embodiment 4 of the present application.
Figure 17:
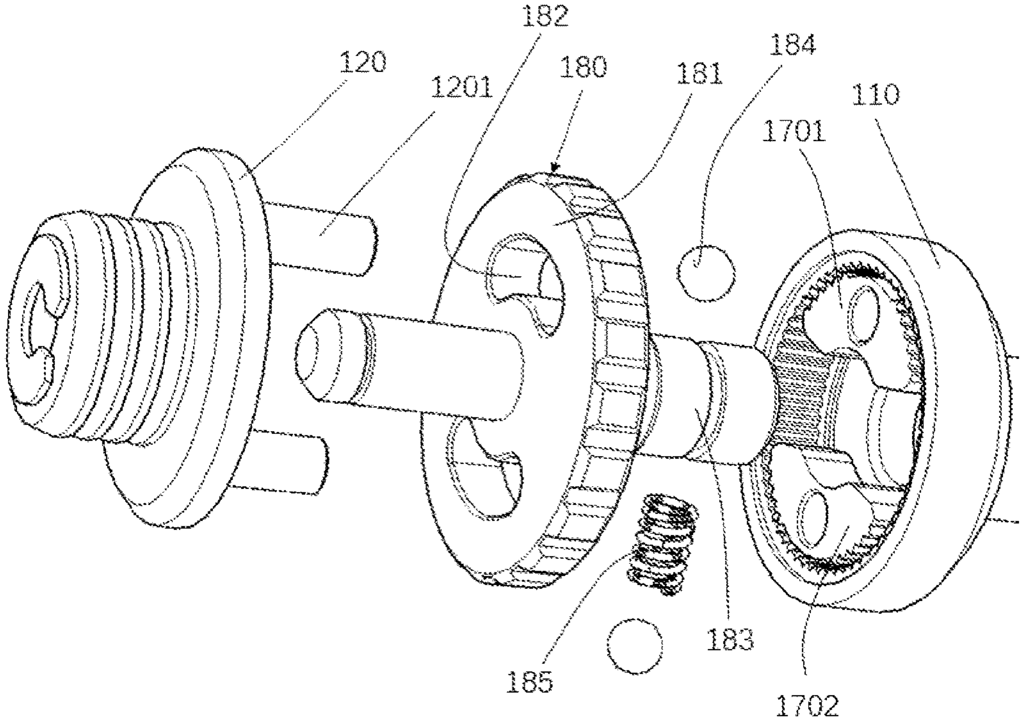
FIG. 17 is a schematic exploded view of Embodiment 4 of the present application.
Figure 18:
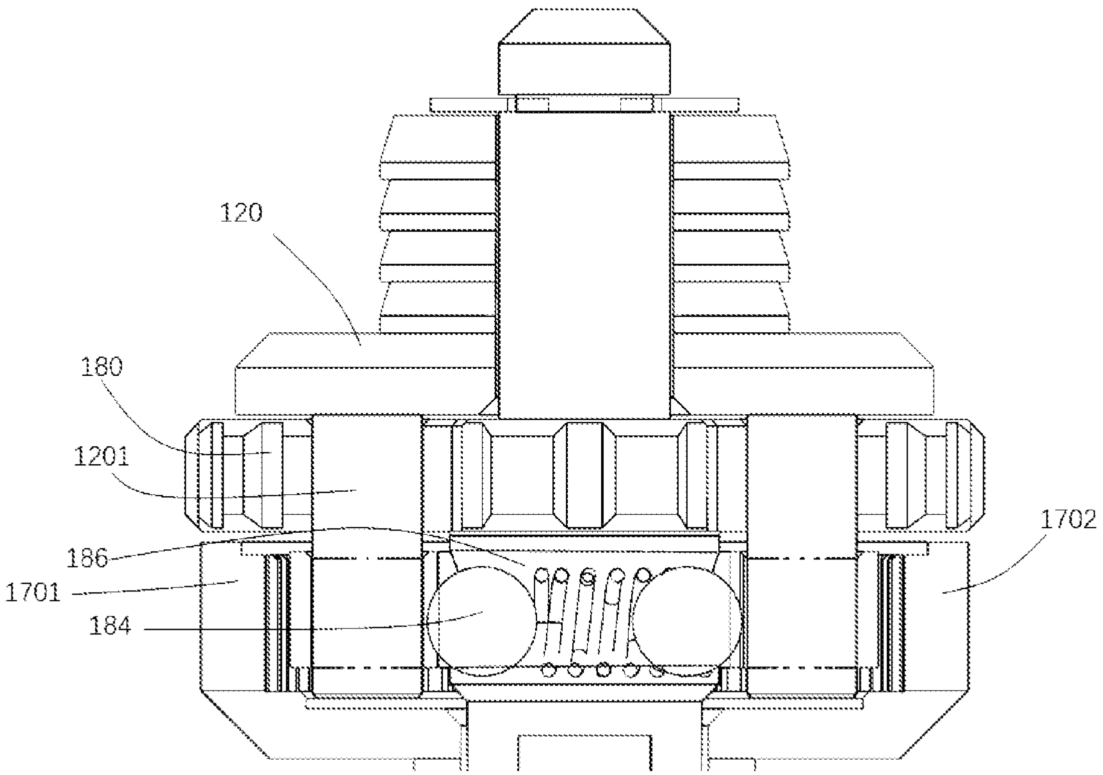
FIG. 18 is a sectional view of Embodiment 4 of the present application.

FIGS. 16 to 18 show the structure of Embodiment 4.

This embodiment is different from Embodiment 1 in that the number of drive transmission members is reduced.

As shown in FIG. 16, this embodiment includes two first drive transmission members 130 and two second drive transmission members 140. It should be understood that the structures of the four drive transmission members may be those described in Embodiment 1, 2 or 3, except that the number is reduced on the basis of Embodiment 1, 2 or 3; or may be a structure in this embodiment to adapt to different types of hand tools.

As shown in FIG. 16, one first drive transmission member 130 and one second drive transmission member 140 are integrated as a whole, i.e., a sector-shaped part. Two ends of the sector-shaped part are respectively provided with ratchet teeth to serve as the first drive transmission member 130 and the second drive transmission member 140 respectively. Two sector-shaped parts, namely a first sector-shaped part 1701 and a second sector-shaped part 1702, are both provided with through holes 171. The second member 120 is provided with columnar portions 1201 passing through the through holes 171 at corresponding positions.

The ratchet mechanism of this embodiment further includes a support member 180. The support member 180 includes an annular portion 181. The annular portion 181 is provided with two arc-shaped holes 182 corresponding to the columnar portions 1201. The columnar portions 1201 pass through the arc-shaped holes 182 and then enter the through holes 171 of the sector-shaped parts 1701 and 1702.

A shaft portion 183 protrudes from a side surface of the annular portion 181 facing the first member 110. The shaft portion 183 is located between the two sector-shaped parts 1701 and 1702. The shaft portion 183 is provided with a limiting hole 186 penetrating along its radial direction. Two openings of the limiting hole 186 are arranged oppositely, with one opening facing the first sector-shaped part 1701 and the other opening facing the second sector-shaped part 1702. Two spherical parts 184 are arranged in the limiting hole 186, and there is a spring 185 between the two spherical parts 184. The two spherical parts 184 are in contact with the first sector-shaped part 1701 and the second sector-shaped part 1702 respectively under the action of the spring 185.

By rotating the annular portion 181, one spherical part 184 may be brought into contact with the first drive transmission member 130 of the first sector-shaped part 1701, and the other spherical part 184 is brought into contact with the first drive transmission member 130 of the second sector-shaped part 1702. Due to the abutment of the spherical parts 184, the two sector-shaped parts 1701 and 1702 are respectively rotated by a slight angle, so that the first drive transmission members 130 are engaged with the teeth 112 on the first member 110, and the second drive transmission members 140 are disengaged from the teeth 112 of the first member 110. When the annular portion 181 is rotated in an opposite direction, the engaged states of the first drive transmission members 130 and the second drive transmission members 140 are reversed.

In this embodiment, the first drive transmission members 130 are respectively engaged with the teeth 112 on the first member 110 in two states: a fully engaged state and a partially engaged state; and the same is true for the second drive transmission members 140. On the sector-shaped parts, contact surfaces of parts for the first drive transmission members and parts for the second drive transmission members with the spherical parts may be set to have different inclination angles relative to the radial direction, so as to realize different engaged states.

Embodiment 5

FIGS. 19 to 23 show the structure of Embodiment 5.

In Embodiments 1 to 4, the teeth of the first member are all provided on the inner circumferential surface of the first member. In this embodiment, the teeth of the first member are provided on the outer circumferential surface of the first member.

Figure 20:
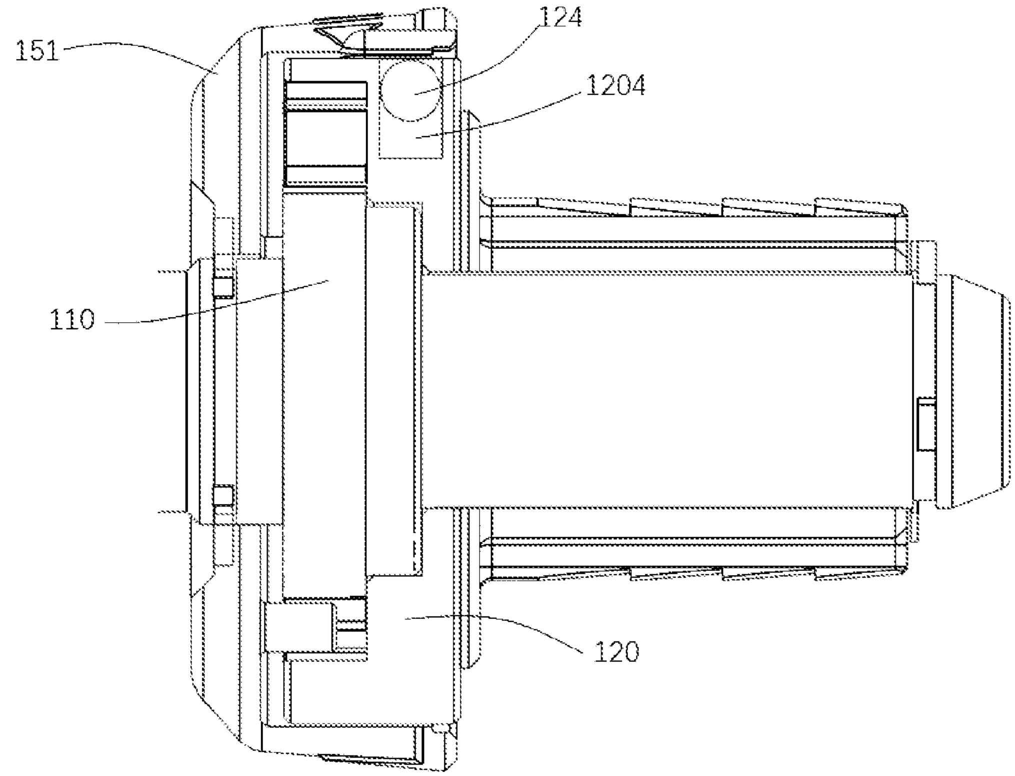
FIG. 20 is a schematic view of an internal structure in Embodiment 5 of the present application.
Figure 21:
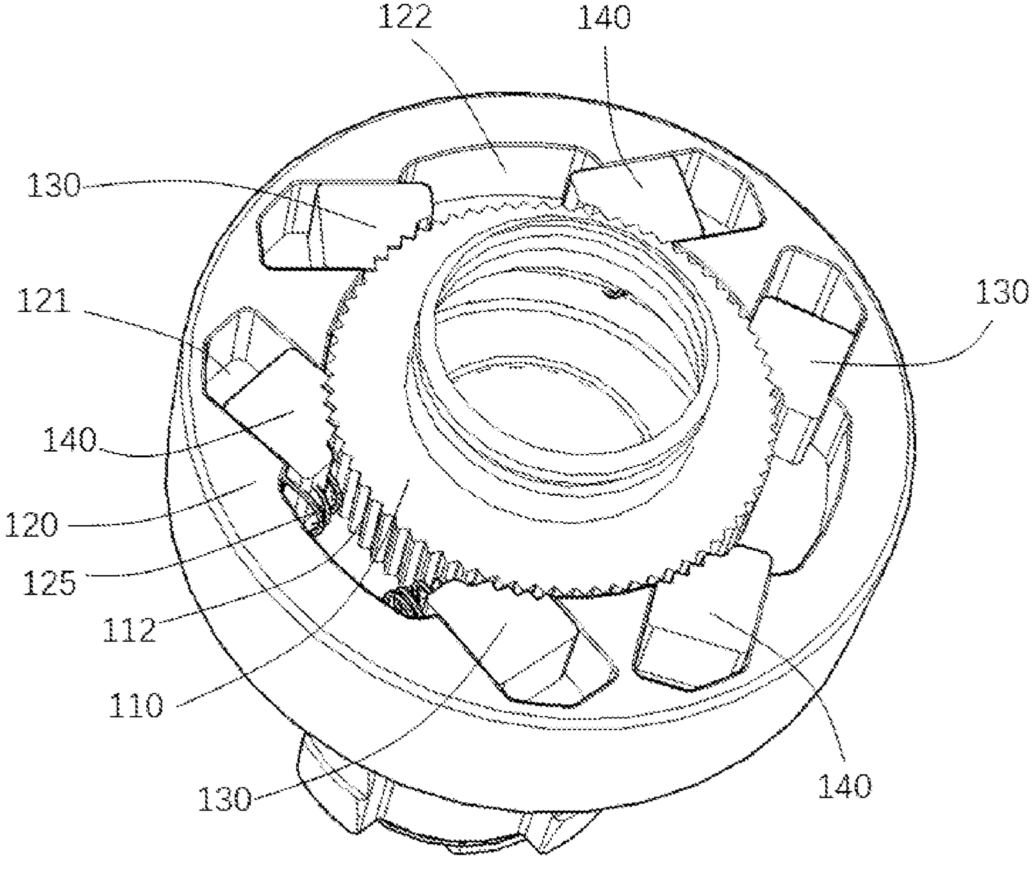
FIG. 21 is a schematic view showing the connection between a drive transmission member, a first member and a second member in Embodiment 5 of the present application.
Figure 22:
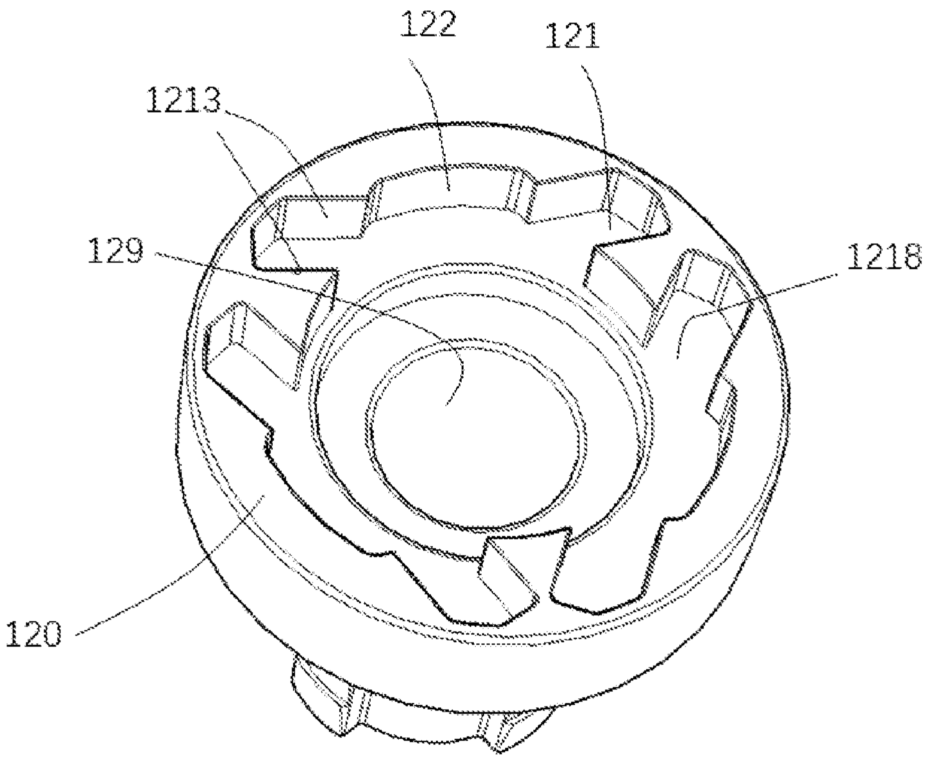
FIG. 22 is a schematic structural view of a second member in Embodiment 5 of the present application.

As shown in FIGS. 20, 21 and 22, a substantially annular chamber 129 is formed at an end of the second member 120. The outer circumferential surface of the first member 110 is provided with a plurality of teeth 112 in the axial direction. The part of the first member 110 provided with the teeth 112 is located within the chamber 129. A plurality of receiving grooves 121 are formed in the sidewall of the chamber 129. The openings 1218 of the receiving grooves 121 face the teeth 112 of the first member 110. One drive transmission member is arranged in one receiving groove 121. The ratchet teeth of the drive transmission members pass through the openings 1218 of the receiving grooves and are engaged with the teeth 112 on the first member 110.

In this embodiment, the number of the first drive transmission members 130 is three, the number of the second drive transmission members 140 is three, and the number of the receiving grooves 121 is six. The first drive transmission members 130 and the second drive transmission members 140 may be distributed in a staggered manner.

A contact surface 1213 of each receiving groove 121 with the drive transmission member has a different inclination angle relative to the radial direction, so as to realize different engaged states between the drive transmission members and the teeth 112 of the first member 110. Its principle is the same as that of Embodiment 1, which will not be repeated here.

Figure 19:
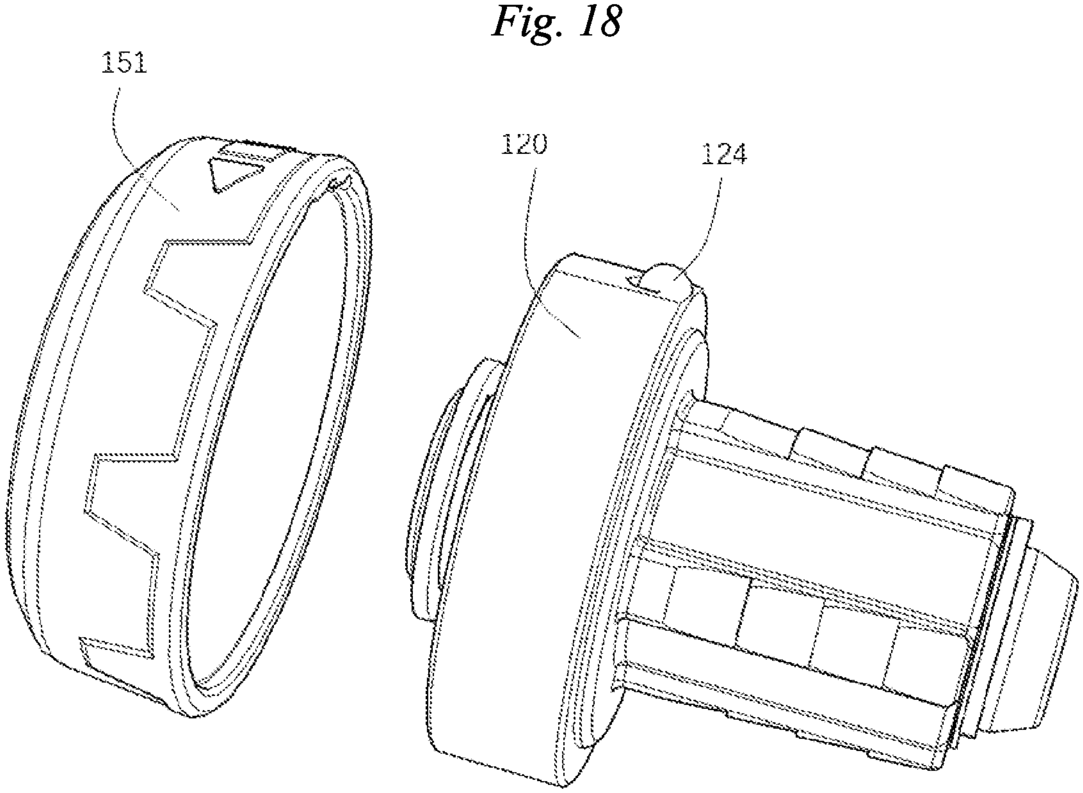
FIG. 19 is a schematic exploded view of Embodiment 5 of the present application.
Figure 23:
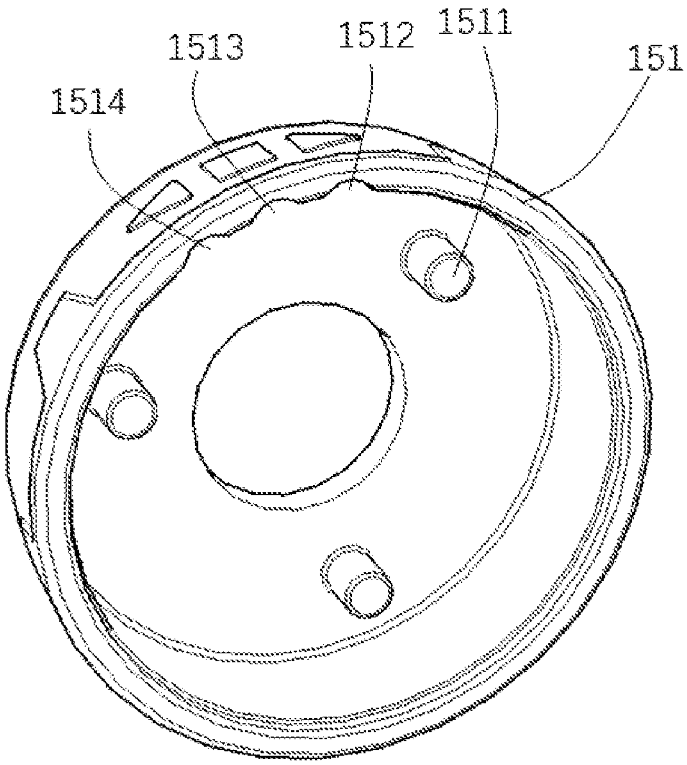
FIG. 23 is a schematic structural view of an end cover of Embodiment 5 of the present application.

As shown in FIGS. 19, 20 and 23, the switching component includes an end cover 151. The second member 120 is sheathed in the end cover 151. Blocking posts 1511 are arranged on an inner side surface of the end cover 151 facing the receiving grooves 121. The sidewall of the chamber 129 is provided with a plurality of limiting grooves 122 cooperating with the blocking posts 1511. One limiting groove 122 is located between two adjacent receiving grooves 121, and a blocking post 1511 extends into the limiting groove 122. When the end cover 151 is rotated, the blocking posts 1511 may slide in the limiting grooves 122. When the drive transmission members 130 and 140 are engaged with the teeth 112, at least part of them are located in the limiting grooves 122. When the blocking posts 1511 move to the ends of the limiting grooves 122, they can be in contact with the drive transmission members 130 and 140, thereby driving the corresponding drive transmission members 130 and 140 to be disengaged from the teeth 112.

A hole 1204 is provided in the sidewall of the second member 120 facing the end cover 151. A locking ball 124 is provided in the hole 1204. A first recess 1512, a second recess 1513 and a third recess 1514 are sequentially provided on the end cover 151 at positions facing the hole 1204. when the end cover 151 is rotated and different recesses face the hole 1204, the locking ball enters a corresponding recess, which can lock the end cover in position. For example, when the locking ball 124 is in the first recess 1512, the blocking posts 1511 are in contact with the first drive transmission members 130, so that the first drive transmission members 130 are disengaged from the teeth 112 and no longer play the role of transmitting motion, i.e., they are not in working states; when the locking ball 124 is in the third recess 1514, the blocking posts 1511 are in contact with the second drive transmission members 140, so that the second drive transmission members 140 are disengaged from the teeth 112 and no longer play the role of transmitting motion, i.e., they are not in working states; and when the locking ball 124 is in the second recess 1513, the blocking posts 1511 are not in contact with the first and second drive transmission members. A second elastic element (not shown in the figures) is provided between the locking ball 124 and the hole 1204.

The drive transmission members are connected with the first elastic elements 125 in the receiving grooves 121, and the first elastic elements 125 can restore the drive transmission members in position.

The above embodiments describe the ratchet mechanism provided by the present application. By arranging the drive transmission members to be in different engaged states with the teeth of the first member, under the condition of keeping the number of teeth unchanged, the number of transmission gears is increased, the transmission efficiency is improved, the shaking is reduced, the strength is guaranteed, and the resistance during backward rotation is smaller, which is conducive to reducing wear and tear. The ratchet mechanism may also realize bidirectional switching with the switching component, and can increase the number of transmission gears in both directions. It should be understood that, the ratchet mechanism is not limited to the embodiments described above, and those of ordinary skills in the art can make various modifications and variations according to the concept of the present application without creative efforts, which are all within the protection scope of the claims of the present application.

2. Ratchet Wrench

The first section describes the ratchet mechanism of the present application, and in this section, the application of the ratchet mechanism in a wrench will be described.

Figure 24:
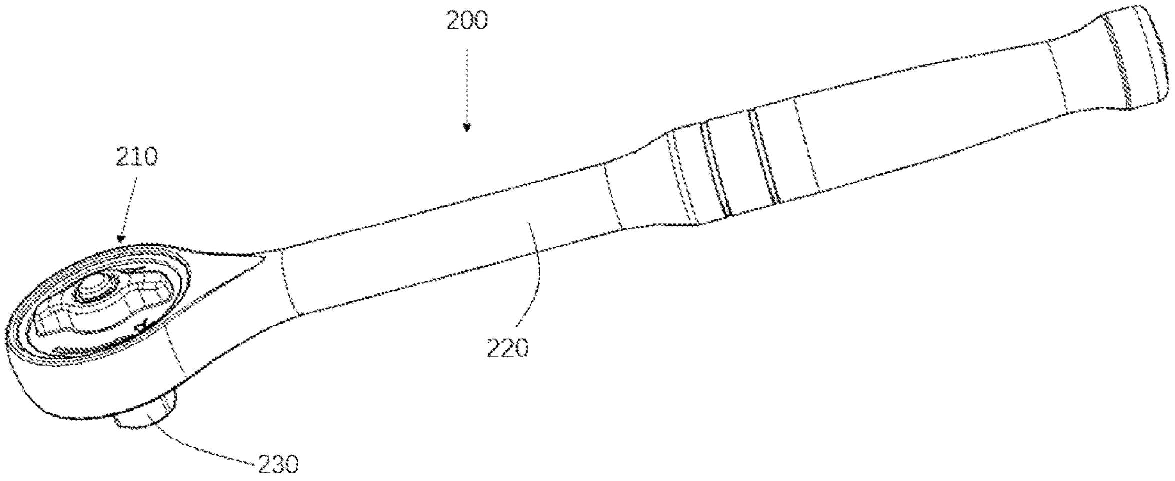
FIG. 24 is a schematic structural view of a wrench of the present application.
Figure 25:
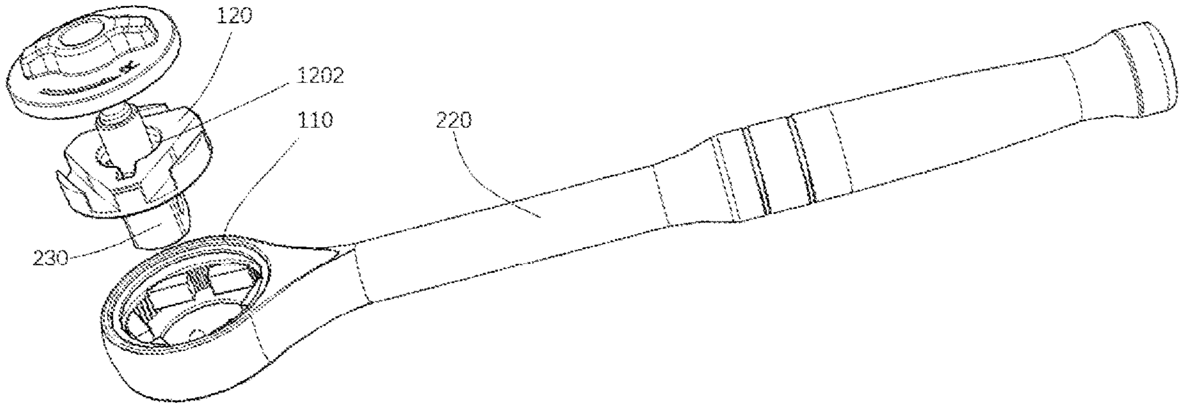
FIG. 25 is a schematic exploded view of a wrench of the present application.

As shown in FIGS. 24 and 25, a wrench 200 includes a handle 220 with a corresponding wrench head 210 provided at an end thereof. The ratchet mechanism described in any one of Embodiments 1 to 4 is arranged in the wrench head 210. The first member 110 of the ratchet mechanism may be configured to be integrally formed with the handle 220. In the example shown, the wrench head 210 is provided with an output end 230 which can be connected to various different sockets. The output end 230 is connected in a central hole 1202 of the second member 120 of the ratchet mechanism, and rotates together with the second member 120. When a user operates the handle 220, torque is applied on the handle 220, thereby driving the first member 110 to rotate, and by driving the transmission members, the motion is transmitted to the second member 120, so that the output end 230 is driven to rotate together to achieve the purpose of torque outputting. When the user rotates the handle 220 in an opposite direction, the ratchet mechanism rotates backward, and the second member 120 does not rotate, so that the user's hand can get back to its original position, thus realizing continuous screwing of a fastener in a small narrow space.

It should be understood that the wrench head 210 may also be provided as an open type, i.e., the central hole 1202 of the second member 120 is provided as a polygonal through hole that may directly cooperates with fasteners, and may receive nuts/fastener heads, so that the wrench can apply torque to the nuts/fastener heads. In addition, wrench heads 210 may also be provided at both ends of the handle 220, respectively.

3. Screwdriver

In this section, the application of the ratchet mechanism in a screwdriver is described.

Figure 26:
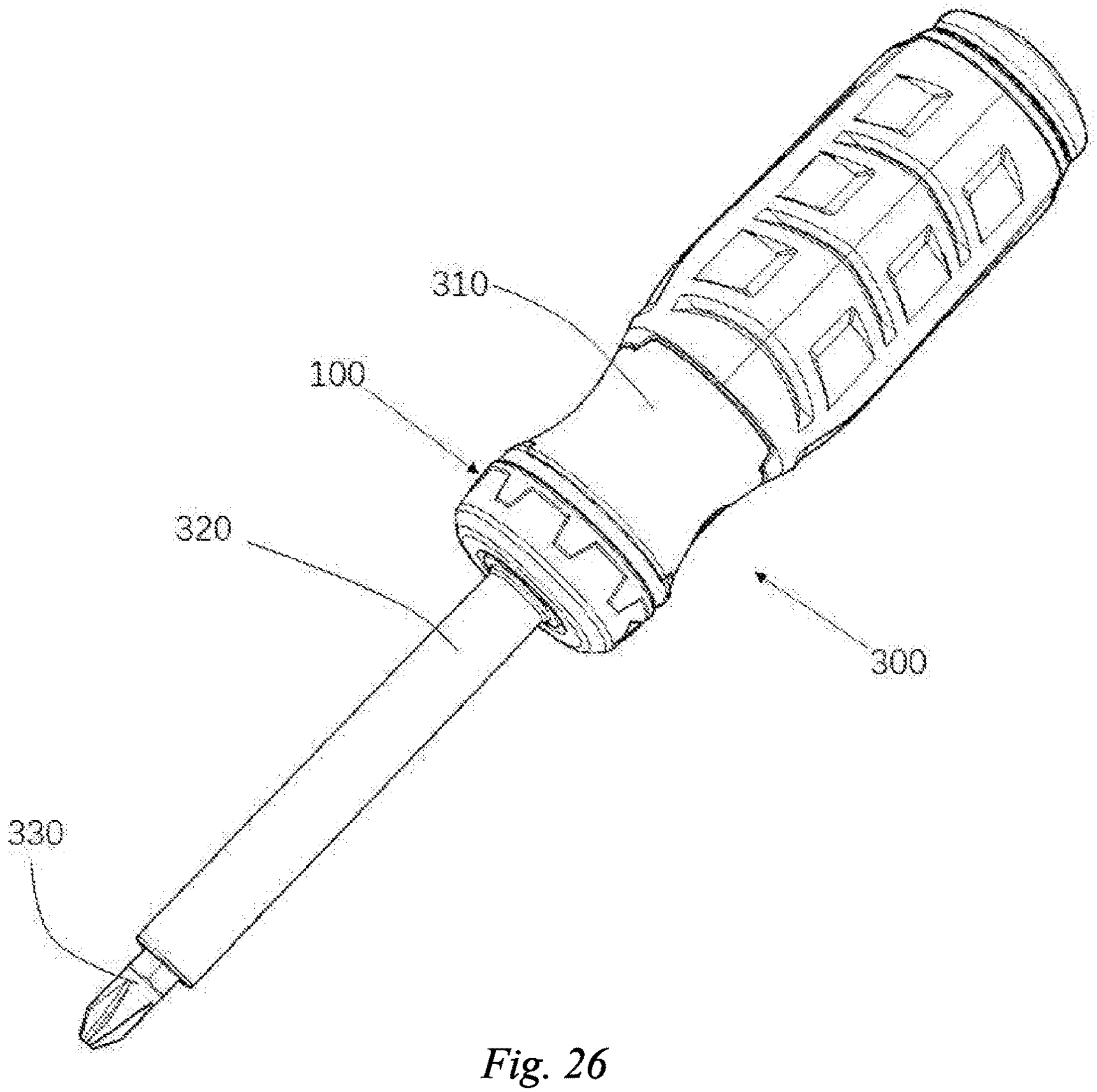
FIG. 26 is a schematic structural view of a screwdriver of the present application.
Figure 27:
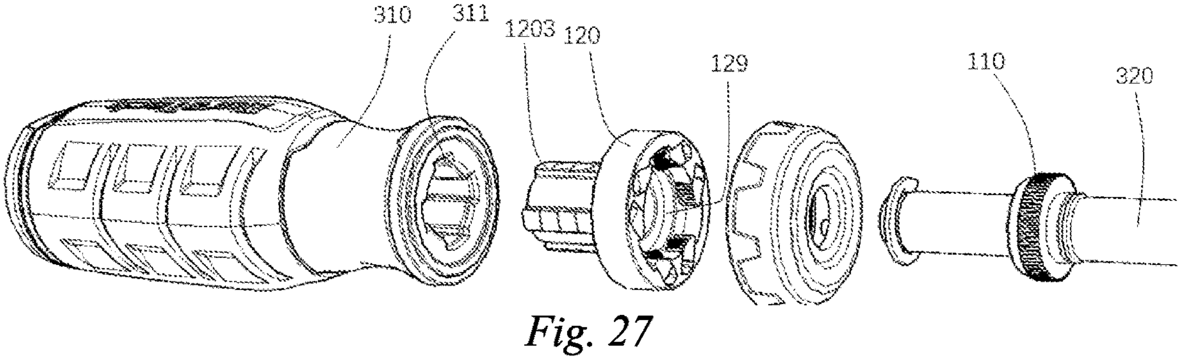
FIG. 27 is a schematic exploded view of FIG. 26.

As shown in FIGS. 26 and 27, a screwdriver 300 includes a handle 310. The handle 310 is connected to an active member of the ratchet mechanism. An output member of the ratchet mechanism is connected to a shaft rod 320. An end of the shaft rod 320 may be provided with a socket or with an output end connected to the head 330 of the screwdriver. Preferably, the ratchet mechanism is the structure described in Embodiment 5. The outer circumferential surface of the first member 110 is provided with teeth, which are located in the chamber 129 of the second member 120. The second member 120 is connected to the handle 310. The shaft rod 320 is connected to the first member 110 and rotates together with the first member 110. The shaft rod 320 may be integrally formed with the first member 110.

When a user uses the screwdriver, torque is applied on the handle 310, thereby driving the second member 120 to rotate, and by driving the transmission members, the motion is transmitted to the first member 110, so that the first member 110 rotates together with the shaft rod 320 so as to output torque. When the user drives the handle 310 to rotate in an opposite direction, the ratchet mechanism rotates backward and the shaft rod 320 does not rotate.

The connection between the second member 120 and the handle 310 may be in any manner known in the prior art. For example, a blind hole is provided inside the handle 310. The sidewall of the blind hole is provided with a groove 311. The second member 120 may be inserted into the blind hole, and meanwhile, the second member 120 is provided with a protrusion 1203 that cooperates with the groove 311. Through the cooperation of the groove 311 and the protrusion 1203, torque transmission from the handle 310 to the second member may be realized. Other connection manners that enable the handle 310 to transmit the torque to the second member 120 are all applicable in this embodiment.

Preferred specific embodiments of the present application are described in detail above. It should be understood that those of ordinary skills in the art may make many modifications and changes according to the concept of the present application without creative work. Therefore, all technical schemes that can be obtained by those skilled in the art through logical analysis, reasoning or limited experiments based on the concept of the present application and the prior art should fall within the scope of protection defined by the claims.

The invention claimed is:

1. A ratchet mechanism, characterized by comprising:

a first member having an annular surface provided with a plurality of teeth that are arranged parallel to its axial direction;

a second member configured to be rotatable relative to a circumferential direction of the annular surface; and a plurality of drive transmission members arranged on the second member, each of the plurality of drive transmission members comprising at least one ratchet tooth, the plurality of drive transmission members being configured to be engaged with the plurality of teeth to transmit motion between the first member and the second member, wherein the plurality of drive transmission members comprises at least two first drive transmission members and at least two second drive transmission members, and when the first member and the second member move relative to each other in a first direction, the first drive transmission members are in working states, and the second drive transmission members are in non-working states, and when the first member and the second member move relative to each other in a second direction, the second drive transmission members are in working states, and the first drive transmission members are in non-working states; and wherein the first drive transmission members and the second drive transmission members are all separate members, or one of the first drive transmitting members and one of the second drive transmitting members are integrated into one member; and wherein each of the drive transmission members in the working states is in different engaged states with the teeth;

wherein the second member comprises a plurality of receiving grooves for supporting the drive transmission members, at least one of the drive transmission members is arranged in each of the receiving grooves, each of the receiving groove has an opening facing the teeth, and at least part of a drive transmission member passes through the opening such that the drive transmission member is engaged with the teeth; and an elastic element is connected to the drive transmission member;

wherein a contact surface of each of the receiving grooves with the drive transmission member received therein has a different inclination angle relative to a radial direction of the annular surface, such that the drive transmission members have different advance angles, so as to be in different engaged states with the teeth;

wherein the teeth are located on an inner circumferential surface of the annular surface and the second member is located within a chamber defined by the annular surface;

wherein the ratchet mechanism comprising an annular support provided at an end of the second member, wherein an elongated through hole is provided in the annular support at a position corresponding to a drive transmission member, one end of the drive transmission member extends into the elongated through hole, and an inclination angle of the elongated through hole relative to the radial direction is the same as that of the corresponding contact surface.

2. The ratchet mechanism of claim 1, characterized in that the engaged states comprise a state in which the plurality of drive transmission members are fully engaged with the teeth, and a state in which the drive transmission members are partially engaged with the teeth.

3. The ratchet mechanism of claim 1, characterized in that each of the receiving grooves has a first opening and a second opening arranged oppositely, one of the first drive transmission members is located at the first opening, and one of the second drive transmission members is located at the second opening; and the elastic element is arranged between the one of the first drive transmission members and the one of the second transmission members.

4. The ratchet mechanism of claim 1, characterized in that each of the drive transmission members has a first side surface and a second side surface arranged oppositely, the at least one ratchet tooth is provided on the first side surface, the second side surface is located in one of the receiving grooves, there is an inclined surface between the first side surface and the second side surface, and the inclined surface is in contact with the contact surface of the one of the receiving grooves; and each of the receiving grooves is provided with one of the drive transmission members, and the elastic element is provided between the one of drive transmission members and a sidewall of the one of the receiving grooves.

5. The ratchet mechanism of claim 1, further comprising a switching component provided on the second member, wherein the switching component is configured to switch the working states of the first drive transmission members and the second drive transmission members.

6. The ratchet mechanism of claim 5, characterized in that the switching component comprises an end cover arranged at an end of the second member and configured to be rotatable to a first position and a second position relative to the second member; at least two blocking pieces are provided on a side of the end cover facing the second member; when the end cover is in the first position, each of the blocking pieces contacts a corresponding one of the first drive transmission members to make it in a non-working state; and when the end cover is in the second position, each of the blocking pieces contacts a corresponding one of the second transmission members to make it in a non-working state.

7. The ratchet mechanism of claim 6, characterized in that a limiting portion protrudes from a side of the end cover facing the second member, the second member is provided with a limiting groove cooperating with the limiting portion, and the limiting portion is configured to be slidable in the limiting groove when the end cover is rotated; and the movement of the limiting portion is blocked by two ends of the limiting groove, so that the end cover is in either the first position or the second position.

8. The ratchet mechanism of claim 7, characterized in that the limiting portion comprises a first recess and a second recess arranged in series, the second member is provided with a locking groove communicating with the limiting groove, and a locking ball is provided in the locking groove; when the end cover is in the first position, the first recess faces the locking groove, so that the locking ball enters the first recess; and when the end cover is in the second position, the second recess faces the locking groove, so that the locking ball enters the second recess.

9. The ratchet mechanism of claim 6, characterized in that a circular boss is provided on a side of the end cover facing the second member, and a circular recessed portion cooperating with the circular boss is provided on the second member; the circular boss is configured to be slidable in the circular recessed portion when the end cover is rotated; and a limiting portion protrudes radially from an edge of the circular boss, a sidewall of the circular recessed portion is provided with a limiting groove, the limiting portion is slidable in the limiting groove, and the movement of the limiting portion is blocked by two ends of the limiting groove, so that the end cover is in either the first position or the second position.

10. The ratchet mechanism of claim 9, characterized in that a first groove and a second groove are provided in the sidewall of the circular recessed portion, a transverse groove is provided in the circular boss, and a locking ball is provided in the transverse groove; when the end cover is in the first position, the transverse groove communicates with the first groove, and the locking ball enters the first groove; and when the end cover is in the second position, the transverse groove communicates with the second groove, and the locking ball enters the second groove.

11. A hand tool, characterized in that the hand tool is a wrench or a screwdriver, and the hand tool comprises a handle and the ratchet mechanism of claim 1 that is connected to the handle; and the handle is configured to drive the first member or the second member of the ratchet mechanism to rotate under the action of an external force.

* * * * *